United States Patent
Lee et al.

(10) Patent No.: US 11,616,368 B2
(45) Date of Patent: Mar. 28, 2023

(54) POWER SUPPLY SYSTEM INCLUDING DC-TO-DC CONVERTER AND CONTROL METHOD THEREFOR

(71) Applicant: LG INNOTEK CO., LTD., Seoul (KR)

(72) Inventors: Jeong Heum Lee, Seoul (KR); Soo Hong Kim, Seoul (KR); Ju Young Jang, Seoul (KR); Jeong Heum Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 215 days.

(21) Appl. No.: 16/956,897

(22) PCT Filed: Sep. 4, 2018

(86) PCT No.: PCT/KR2018/010276
§ 371 (c)(1),
(2) Date: Jun. 22, 2020

(87) PCT Pub. No.: WO2019/124678
PCT Pub. Date: Jun. 27, 2019

(65) Prior Publication Data
US 2020/0321880 A1    Oct. 8, 2020

(30) Foreign Application Priority Data

Dec. 22, 2017 (KR) .................. 10-2017-0178483
Jan. 25, 2018 (KR) .................. 10-2018-0009063
Jan. 25, 2018 (KR) .................. 10-2018-0009066

(51) Int. Cl.
*H02J 3/32*     (2006.01)
*H02J 7/00*     (2006.01)
(Continued)

(52) U.S. Cl.
CPC ............. *H02J 3/32* (2013.01); *H02H 7/1213* (2013.01); *H02J 7/00712* (2020.01); *H02J 7/06* (2013.01);
(Continued)

(58) Field of Classification Search
CPC ...... H02J 3/32; H02J 7/00712; H02J 2207/20; H02J 7/007
See application file for complete search history.

(56) References Cited

U.S. PATENT DOCUMENTS 9,236,760 B2 *  1/2016  Iyasu .................... H02J 7/04
9,660,517 B2    5/2017  Hirota et al.
(Continued)

FOREIGN PATENT DOCUMENTS

EP    2 339 713 A2     6/2011
JP    2003-339118 A    11/2003
(Continued)

OTHER PUBLICATIONS

International Search Report (PCT/ISA/210) issued in PCT/KR2018/010276, dated Feb. 8, 2019.
(Continued)

*Primary Examiner* — Gustavo A Rosario-Benitez
(74) *Attorney, Agent, or Firm* — Birch, Stewart, Kolasch & Birch, LLP

(57) ABSTRACT

A DC-DC converter includes a bridge circuit electrically connected to a DC link capacitor; an inductor and a capacitor electrically connected to the bridge circuit, in which the inductor is connected to a first end of a battery, and the capacitor is connected to the first end and a second end of the battery; a sensor configured to sense a voltage between the bridge circuit and the DC link capacitor; and a controller configured to control switching operations of the bridge circuit so that a power output by the DC-DC converter and
(Continued)

supplied to the first end of the battery has a droop curve-shaped power value according to the sensed voltage.

13 Claims, 22 Drawing Sheets

(51) Int. Cl.
  *H02H 7/12* (2006.01)
  *H02J 7/06* (2006.01)
  *H02M 3/335* (2006.01)
(52) U.S. Cl.
  CPC ..... *H02M 3/33584* (2013.01); *H02J 2207/20* (2020.01)

(56) References Cited

U.S. PATENT DOCUMENTS

| | | | |
|---|---|---|---|
| 9,748,855 B2 | 8/2017 | Lee | |
| 10,090,685 B2* | 10/2018 | Shim | H02J 7/0048 |
| 10,811,993 B2* | 10/2020 | Vanderzaden | H02M 7/445 |
| 2006/0043951 A1* | 3/2006 | Oswald | H02M 3/156 323/282 |
| 2006/0044846 A1* | 3/2006 | Hjort | H03K 17/687 363/34 |
| 2008/0068866 A1* | 3/2008 | Blanken | H02M 3/156 363/21.01 |
| 2008/0290845 A1* | 11/2008 | Holveck | H02M 5/271 323/214 |
| 2010/0225292 A1* | 9/2010 | Nishimori | H02M 3/156 323/288 |
| 2011/0115295 A1* | 5/2011 | Moon | H02J 3/383 307/65 |
| 2011/0133555 A1 | 6/2011 | Choi | |
| 2011/0137481 A1 | 6/2011 | Manz et al. | |
| 2013/0147441 A1 | 6/2013 | Lee et al. | |
| 2014/0327306 A1* | 11/2014 | Inoue | H02J 7/007194 320/134 |
| 2014/0339898 A1 | 11/2014 | Mueller | |
| 2015/0138843 A1* | 5/2015 | Inoue | H02M 3/33507 363/21.01 |
| 2015/0263615 A1* | 9/2015 | Moon | H02M 3/158 323/266 |
| 2015/0326021 A1* | 11/2015 | Cousineau | H02M 7/4837 307/52 |
| 2015/0333523 A1 | 11/2015 | Kamalasadan et al. | |
| 2015/0372584 A1 | 12/2015 | Hirota et al. | |
| 2016/0268818 A1 | 9/2016 | Shim | |
| 2016/0306372 A1* | 10/2016 | Holveck | G05F 1/625 |
| 2016/0344297 A1* | 11/2016 | Lee | H02M 3/33592 |

FOREIGN PATENT DOCUMENTS

| | | |
|---|---|---|
| JP | 2012-135208 A | 7/2012 |
| JP | 2012-161190 A | 8/2012 |
| JP | 2014-166068 A | 9/2014 |
| JP | 2014-176226 A | 9/2014 |
| JP | 2015-89171 A | 5/2015 |
| JP | 2016-167965 A | 9/2016 |
| KR | 10-2008-0028831 A | 4/2008 |
| KR | 10-2011-0062850 A | 6/2011 |
| KR | 10-2012-0047575 A | 5/2012 |
| KR | 10-1224570 B1 | 1/2013 |
| KR | 10-2013-0131602 A | 12/2013 |
| KR | 10-1394712 B1 | 5/2014 |
| KR | 10-2016-0078013 A | 7/2016 |
| KR | 10-2016-0135958 A | 11/2016 |
| KR | 10-2017-0078974 A | 7/2017 |
| KR | 10-1785662 B1 | 10/2017 |
| KR | 10-1809787 B1 | 12/2017 |

OTHER PUBLICATIONS

Vavilapalli et al., "Power Balancing Control for Grid Energy Storage System in Photovoltaic Applications—Real Time Digital Simulation Implementation," Energies, vol. 10, issue 7, No. 928, Jul. 5, 2017, pp. 1-22.

Parks et al., "Black Start Control of a Solid State Transformer for Emergency Power Restoration", 2012 IEEE Energy Conversion Congress and Exposition (ECCE), Sep. 15, 2012, pp. 188-195.

Xue et al., "Stationary Energy Storage System based on Modular High Voltage Battery Modules", 2015 IEEE First International Conference on DC Microgrids (ICDCM), Jun. 7, 2015, pp. 153a-153f (pp. 1-6).

Ye et al., "Impedance Modeling and Verification of a Dual Active Bridge (DAB) DC/DC Converter Enabled DC Microgrid in FREEDM System", 2016 IEEE 8th International Power Electronics and Motion Control Conference (IPEMC-ECCE Asia), May 22, 2016, pp. 2875-2879 (pp. 1-5).

Ye et al., "Impedance modeling and verification of a dual active bridge (DAB) DC/DC converter enabled DC microgrid in FREEDM system," 2016 IEEE 8th International Power Electronics and Motion Control Conference (IPEMC-ECCE Asia), IEEE, 2016.

Ghavami et al., "Reliability evaluation of electric vehicle charging systems including the impact of repair," 2017 IEEE Industry Applications Society Annual Meeting, IEEE, Oct. 2017, pp. 1-9.

Yilmaz et al., "Review of battery charger topologies, charging power levels, and infrastructure for plug-in electric and hybrid vehicles," IEEE transactions on Power Electronics, vol. 28, No. 5, May 2012, pp. 2151-2169.

* cited by examiner

POWER SUPPLY SYSTEM INCLUDING DC-TO-DC CONVERTER AND CONTROL METHOD THEREFOR

CROSS-REFERENCE TO RELATED APPLICATIONS

This Application is a National Phase of PCT International Application No. PCT/KR2018/010276 filed on Sep. 4, 2018, which claims the priority benefit under 35 U.S.C. § 119(a) to Korean Patent Application Nos. 10-2017-0178483 filed on Dec. 22, 2017, 10-2018-0009063 filed on Jan. 25, 2018 and 10-2018-0009066 filed on Jan. 25, 2018, all filed in the Republic of Korea, and all of which are hereby expressly incorporated by reference into the present application.

BACKGROUND OF THE INVENTION

Field of the Invention

Embodiments relate to a power supply system including a DC-to-DC converter and a control method therefor.

Discussion of the Related Art

Electrical energy is widely used because it is easy to convert and transfer. In order to efficiently use such electric energy, an energy storage system (ESS) is used. The ESS receives power and charges a battery. In addition, the ESS discharges the charged power of the battery to supply the power when the power is needed. Through this, the ESS can supply power flexibly.

Specifically, when a power supply system includes an energy storage system, it operates as follows. The energy storage system discharges electrical energy stored in a battery when a load or a system is overloaded. In addition, when the load or the system is light loaded, the energy storage system receives power from a power generation device or the system and charges the battery.

In addition, when the energy storage system is independent of the power supply system, the energy storage system receives idle power from an external power supply source and charges the battery. In addition, when the system or the load is overloaded, the energy storage system discharges power charged by the battery to supply the power.

Meanwhile, the energy storage system should initially charge or pre-charge a voltage of a DC link disposed at an input terminal of an inverter of the power supply system when the battery is in a discharging mode operation to reduce a voltage difference between a battery side and an inverter side and shut off an inrush current. In order to initially charge the voltage of the DC link, the power supply system was supplied with initial charging power from the power generation device or the system.

However, when the initial charging power is not supplied from the power generation device and the initial charging power supply in the system is interrupted because there is no generated power, the energy storage system has a problem that it cannot initially charge the voltage of the DC link.

In addition, in the energy storage system, when a DC/DC converter performs power conversion, power conversion efficiency changes depending on a ratio of output power. In particular, the DC/DC converter has a problem that the power conversion efficiency drastically decreases below a predetermined ratio of the output power, and finally, the energy storage system has a problem that efficiency of energy supply or demand with a battery is reduced.

In addition, when the battery is discharged, the energy storage system drives the DC/DC converter to charge the battery. In this case, the DC/DC converter was supplied with standby power from the battery for driving. However, when the battery is completely discharged or over-discharged, since the energy storage system was not supplied with standby power from the battery, may not operate the DC/DC converter, and should to replace the battery, there was a problem of wasting costs and wasting resources.

In addition, the energy storage system performs a droop control in order to improve stability in charging or discharging operation of the battery. In particular, the energy storage system performs the droop control according to a state of charge (SOC) of the battery. However, in order to perform the droop control according to the state of charge (SOC) of the battery, a communication line and a communication unit for communicating with a battery management system (BMS) of the battery were separately needed, and there is a limit in improving the stability during battery charging or discharging operation due to speed delay of a feedback process using communication.

SUMMARY OF THE INVENTION

An embodiment has been devised to solve problems of the related art described above, and an object of the embodiment is to provide an energy storage system including a DC/DC converter, a power supply system including the same, and a control method therefor.

In addition, the embodiment provides an energy storage system including a DC/DC converter capable of initially charging a voltage of a DC link without a separate configuration, a power supply system including the same, and a control method therefor.

In addition, the embodiment provides an energy storage system including a DC/DC converter excellent in power conversion efficiency, a power supply system including the same, and a control method therefor.

In addition, the embodiment provides an energy storage system including a DC/DC converter capable of charging a battery without battery replacement even though the battery is over-discharged, a power supply system including the DC/DC converter, and a control method therefor.

In addition, the embodiment is to provide an energy storage system including a DC/DC converter capable of quickly determining an operation mode of charging or discharging a battery, a power supply system including the same, and a control method therefor.

In addition, the embodiment provides an energy storage system including a DC/DC converter that does not require a separate communication line and a communication unit for droop control when charging or discharging of a battery, a power supply system including the same, and a control method therefor.

In addition, the embodiment provides an energy storage system including a DC/DC converter capable of quick droop control when charging or discharging a battery, a power supply system including the same, and a control method therefor.

Technical problems to be solved by the embodiments are not limited to the above-mentioned technical problems, and other technical problems not mentioned may be clearly understood by those skilled in the art to which the embodiments belong from the following descriptions.

In order to solve the above technical problems, a power supply system according to an embodiment includes: a power generation device for generating electric energy; an inverter for inverting the electric energy into an AC current; an energy storage system that receives the electric energy to charge a battery and discharges the charged electric energy to supply the electric energy to the inverter; and a DC link capacitor disposed between the inverter and the energy storage system, wherein the energy storage system includes a DC/DC converter including a switch and disposed between the DC link capacitor and the battery, and the DC/DC converter may provide a current to the DC link capacitor before a discharging operation of the battery is started to charge a voltage of the DC link capacitor up to an operating voltage of the inverter.

In addition, in the power supply system according to the embodiment, the DC/DC converter may be an isolation type converter, and the DC/DC converter may include a bridge circuit unit, wherein the bridge circuit unit may include: a transformer; a first full bridge circuit disposed on a primary side of the transformer; and a second full bridge circuit disposed on a secondary side of the transformer, and the DC/DC converter may provide the current using the bridge circuit unit.

In addition, in the power supply system according to the embodiment, the DC/DC converter may be a non-isolation type converter, and the DC/DC converter may include a top switch unit and a bridge circuit unit, wherein the bridge circuit unit may include a full bridge circuit, the top switch unit may include one or more switches, and the DC/DC converter may provide the current using the top switch unit and the bridge circuit unit.

In addition, in the power supply system according to the embodiment, the energy storage system may include a charging control unit for controlling the DC/DC converter, wherein the charging control unit may allow the DC/DC converter to provide a current having a predetermined power conversion efficiency when output power of the DC/DC converter is less than a reference power, and may control a pulse width provided to the DC/DC converter to control output power.

A DC/DC converter according to an embodiment includes: an overcurrent protection circuit unit connected to a first terminal thereof; a DC stabilization circuit unit connected to a second terminal thereof; and a bridge circuit unit electrically connected between the overcurrent protection circuit unit and the DC stabilization circuit unit and including a switch, wherein the DC/DC converter may provide a current to a DC link capacitor electrically connected to the first terminal before a discharging operation of a battery electrically connected to the second terminal is started to charge a voltage of the DC link capacitor up to an operating voltage of an inverter.

In addition, in the DC/DC converter according to the embodiment, the DC/DC converter may be an isolation type converter, and the bridge circuit unit may include: a transformer; a first full bridge circuit disposed on a primary side of the transformer; and a second full bridge circuit disposed on a secondary side of the transformer, and the DC/DC converter may provide the current using the bridge circuit unit.

In addition, in the DC/DC converter according to the embodiment, the DC/DC converter may be a non-isolation type converter, and may further include a top switch unit disposed between the first terminal and a bridge circuit unit, wherein the bridge circuit unit may include a full bridge circuit, the top switch unit may include one or more switches, and the DC/DC converter may provide the current using the top switch unit and the bridge circuit unit.

In addition, the DC/DC converter according to the embodiment may provide a current having a predetermined power conversion efficiency when output power is less than a reference power, and the output power may be controlled by a pulse width provided to the DC/DC converter.

In a power supply system including an energy storage system that charges a battery with electric energy generated by a power generation device and discharges the charged electric energy to provide the electric energy to an inverter, a power supply method according to an embodiment includes: starting a battery discharging mode; starting an initial charging mode when a voltage of a DC link capacitor disposed between the inverter and the energy storage system is less than an operating voltage of the inverter; providing, by a DC/DC converter, an initial charging current to the DC link capacitor; and performing, by the DC/DC converter, a discharging operation of the battery when the voltage is greater than or equal to the operating voltage.

The power supply method according to the embodiment may further include: determining whether the current is greater than or equal to a reference current when the voltage is less than the operating voltage after the initial charging mode is started; stopping the DC/DC converter from providing an initial charging current to the DC link capacitor when the current is greater than or equal to the reference current; determining whether the current is less than or equal to a set current after the provision of the initial charging current is interrupted; and providing, by the DC/DC converter, the initial charging current when the current is greater than or equal to the set current.

In a power supply system including an energy storage system that charges a battery with electric energy generated by a power generation device and discharges the charged electric energy to provide the electric energy to an inverter, a power supply method according to an embodiment includes: operating the energy storage system in a charging mode or a discharging mode; determining whether a DC/DC converter is in a control region of converter efficiency; and controlling the converter efficiency of the DC/DC converter when the DC/DC converter is in the control region of the converter efficiency, wherein determining whether the DC/DC converter is in the control region of the converter efficiency may determine whether output power of the DC/DC converter is less than a reference power.

In the power supply method according to the embodiment, the controlling of the converter efficiency may include calculating a pulse width based on the output power.

In order to solve the above technical problems, a DC/DC converter according to an embodiment includes: an overcurrent protection circuit unit connected to a first terminal; a DC stabilization circuit unit connected to a second terminal; a bridge circuit unit electrically connected between the overcurrent protection circuit unit and the DC stabilization circuit unit and including a switch; a control unit for controlling the bridge circuit unit; an auxiliary power supply unit for generating a driving power of the control unit based on a first power supplied to the second terminal; and a backup power supply unit electrically connected between the first terminal and the auxiliary power supply unit, wherein when the first power is not supplied to the auxiliary power supply unit from the second terminal, the backup power supply unit may provide a second power to the auxiliary power supply unit.

In addition, in the DC/DC converter according to the embodiment, the first power may be standby power, and the second power may be minimum power for generating the driving power of the control unit.

In addition, in the DC/DC converter according to the embodiment, when the first power is not supplied from the second terminal to the auxiliary power supply unit, a battery connected to the second terminal may be in an over-discharge state.

In addition, in the DC/DC converter according to the embodiment, a DC link capacitor may be connected to the first terminal.

In addition, in the DC/DC converter according to the embodiment, the backup power supply unit may provide the second power based on power input to the first terminal.

Further, in the DC/DC converter according to the embodiment, the backup power supply unit may provide the second power based on power input from a terminal connected to an external power supply.

In addition, the DC/DC converter according to the embodiment may further include a current limiter between the backup power supply unit and the second terminal.

In a power conversion method for receiving power from a first terminal and providing power to a second terminal, a power conversion method according to an embodiment may include: when a first power is provided in the second terminal, providing the first power to an auxiliary power supply unit; when the first power is not provided in the second terminal, providing a second power to the auxiliary power supply unit by a backup power supply unit; and generating driving power of a control unit based on the first power or the second power by the auxiliary power supply unit.

In order to solve the above technical problems, a DC/DC converter according to an embodiment includes: an overcurrent protection circuit unit connected to a first terminal; a DC stabilization circuit unit connected to a second terminal; a bridge circuit unit electrically connected between the overcurrent protection circuit unit and the DC stabilization circuit unit and including a switch; and a control unit for controlling the bridge circuit unit, wherein the control unit may determine an operation mode and reference power according to the magnitude of a voltage of the first terminal.

In addition, in the DC/DC converter according to the embodiment, the control unit may provide a switching signal for controlling the switch to the bridge circuit based on the determined reference power.

In addition, in the DC/DC converter according to the embodiment, a DC link capacitor may be connected to the first terminal.

In addition, in the DC/DC converter according to the embodiment, the operation mode may be a charging mode when the voltage of the first terminal is greater than or equal to a first voltage, a standby mode when the voltage of the first terminal is less than the first voltage and greater than a second voltage, and a discharging mode when the voltage of the first terminal is less than or equal to the second voltage.

In addition, in the DC/DC converter according to the embodiment, the reference power may be calculated by multiplying a charging power slope after subtracting the first voltage from the voltage of the first terminal when the operation mode is the charging mode, and may be calculated by multiplying a discharging power slope after subtracting the voltage of the first terminal from the second voltage when the operation mode is the discharging mode.

In addition, in the DC/DC converter according to the embodiment, the control unit may generate the switching signal when the determined reference power is greater than a set maximum power based on the maximum power, the switching signal when the determined reference power is greater than an inverter limitation power based on the inverter limitation power, and the switching signal when the determined reference power is greater than a battery limitation power based on the battery limitation power.

A power conversion method according to an embodiment includes: sensing a voltage of a first terminal; selecting an operation mode according to the magnitude of the voltage of the first terminal; determining a reference power according to the magnitude of the voltage of the first terminal; and generating a switching signal based on the determined reference power.

Advantageous Effects

The effects of an energy storage system including a DC/DC converter according to an embodiment, a power supply system including the same, and a control method therefore will be described as follows.

In the embodiment, a voltage of a DC link may be initially charged without a separate configuration.

In addition, in the embodiment, since an initial charging speed of the voltage of the DC link is fast, a discharging operation of a battery may be performed quickly.

In addition, in the embodiment, power conversion efficiency of the DC/DC converter may be excellent.

In addition, in the embodiment, the power conversion efficiency of the DC/DC converter is excellent, and thus energy efficiency transferred when the battery is charged or discharged may be high.

In addition, in the embodiment, the battery may be charged even though the battery is over-discharged.

Further, in the embodiment, it is not necessary to replace the battery even though the battery is over-discharged. Furthermore, in the embodiment, it is possible to quickly determine an operation mode of charging or discharging the battery.

In addition, in the embodiment, a separate communication line and a communication unit are not required for droop control when charging or discharging the battery.

Further, in the embodiment, quick droop control is possible when charging or discharging the battery.

Effects obtained in embodiments are not limited to the effects mentioned above, and other effects not mentioned may be clearly understood by those skilled in the art to which the embodiments belong from the following descriptions.

BRIEF DESCRIPTION OF THE DRAWINGS

Hereinafter, the accompanying drawings are provided to help in understanding of an embodiment, and provide embodiments of the present invention together with the detailed description. However, the technical features of the embodiments are not limited to a specific drawing, and the features disclosed in each drawing may be combined with each other to form a new embodiment.

DETAILED DESCRIPTION OF THE EMBODIMENTS

Figure 1:
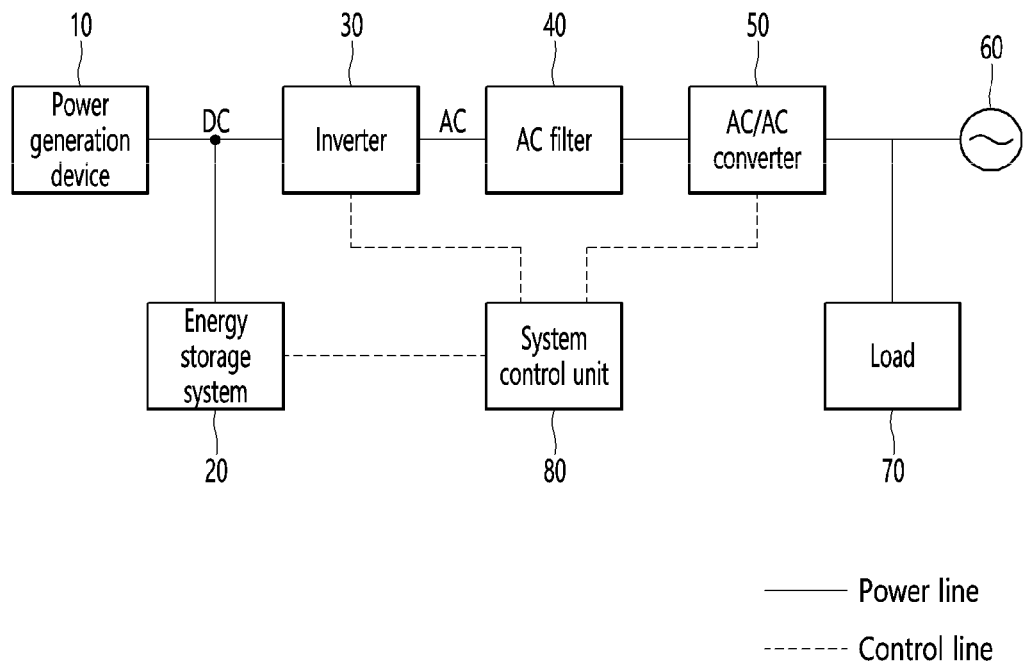
FIG. 1 is a view for describing a schematic configuration of a power supply system according to an embodiment.

Hereinafter, embodiments related to the present invention will be described in detail with reference to the drawings. The component suffixes "module" and "part" used in the following description are given or mixed together only considering the ease of creating the specification, and have no meanings or roles that are distinguished from each other by themselves.

Advantages, features, and methods of achieving the same of the present disclosure will become clear upon referring to embodiments described below in detail with reference to the accompanying drawings. However, the present disclosure is not limited to the embodiments disclosed below and may be implemented in various other forms. The embodiments are merely provided to make the disclosure of the present disclosure complete and completely inform one of ordinary skill in the art to which the present disclosure pertains of the scope of the present disclosure. The present disclosure is defined only by the scope of the claims below. Like reference numerals refer to like elements throughout.

In describing embodiments of the present disclosure, when detailed description of a known function or configuration is deemed to unnecessarily blur the gist of the present disclosure, the detailed description will be omitted. Terms described below are terms defined in consideration of functions in the embodiments of the present disclosure and may vary depending on the intention of a user or operator or a practice. Therefore, such terms should be defined on the basis of the entire contents disclosed herein.

Combinations of blocks and steps of flowcharts in the accompanying drawings may be performed by computer program instructions. Such computer program instructions may be embedded in a processor of a general-purpose computer, a special-purpose computer, or other programmable data processing equipment. Therefore, the instructions performed by the processor of other programmable data processing equipment generate means for performing functions described in each of the blocks or each of the steps in the flowcharts in the drawings. Therefore, the instructions performed by the processor of other programmable data processing equipment generate means for performing functions described in each of the blocks or each of the steps in the flowcharts in the drawings. Because the computer program instructions may also be saved in a computer-usable or computer-readable memory capable of supporting a computer or other programmable data processing equipment to implement a function in a specific way, the instructions stored in the computer-usable or computer-readable memory may also produce a manufacturing item which incorporates an instruction means performing a function described in each of the blocks or each of the steps of the flowcharts in the drawings. Because the computer program instructions may also be embedded in a computer or other programmable data processing equipment, the instructions performed in a computer or other programmable data processing equipment by a process executed in a computer being generated by a series of operation steps being performed in the computer or other programmable data processing equipment may also provide steps for executing functions described in each of the blocks and each of the steps of the flowcharts in the drawings.

In addition, each of the blocks or each of the steps may represent a module, a segment, or a part of a code including one or more executable instructions for executing specified logical functions. Also, it should be noted that functions mentioned in the blocks or steps may also be performed in a different order in a few alternative embodiments. For example, two blocks or steps which are consecutively illustrated may substantially be performed simultaneously, or the blocks or steps may also be performed in a reverse order sometimes according to corresponding functions.

FIG. 1 is a view for describing a schematic configuration of a power supply system according to an embodiment. Referring to FIG. 1, a power supply system according to an embodiment may include a power generation device 10, an energy storage system 20, an inverter 30, an AC filter 40, an AC/AC converter 50, a system 60, a system control unit 80, and a load 70.

The power generation device 10 may produce electric energy. When the power generation device 10 is a solar power generation system, the power generation device 10 may be a solar cell array. The solar cell array is a combination of a plurality of solar cell modules. The solar cell module may be a device in which a plurality of solar cells are connected in series or in parallel to convert solar energy into electric energy and which generates a predetermined voltage and current. Therefore, the solar cell array may absorb solar energy and convert it into electrical energy. In addition, when the power generation device 10 is a wind power generation system, the power generation device 10 may be a fan that converts wind energy into electric energy.

Meanwhile, the power generation device 10 is not limited thereto, and may be configured into a tidal power generation system in addition to the solar power generation system and the wind power generation system. However, it is merely illustrative, and the power generation device 10 is not limited to the above-mentioned types, and may include all power generation systems that generate electric energy using new renewable energy such as solar heat and geothermal heat.

In addition, the power supply system 1 may supply power only through the energy storage system 20 without the power generation device 10. In this case, the power supply system 1 may not include the power generation device 10.

The inverter 30 may convert DC power into AC power. More specifically, DC power supplied by the power generation device 10 or DC power discharged by the energy storage system 20 may be converted into AC power.

The AC filter 40 may filter noise of power converted into the AC power. In addition, the AC filter 40 may be omitted according to an embodiment.

The AC/AC converter 50 may convert the magnitude of a voltage of the AC power in which noise is filtered so that the AC power may be supplied to the system 60 or the load 70, and may supply the converted AC power to the system 60 or the load 70. In addition, the AC/AC converter 50 may be omitted according to an embodiment.

The system 60 is a system in which many power plants, substations, transmission/distribution lines, and loads are integrated to generate and utilize electric power.

The load 70 may be supplied with electric energy from the power generation system such as the power generation device 10 or the energy storage system 20 to consume electric power.

The energy storage system (ESS) 20 may charge the electric energy supplied from the power generation device 10, and may discharge the charged electric energy according to a power supply status of the system 60 or the load 70. More specifically, when the system 60 or the load 70 is light loaded, the energy storage system 20 may receive idle power from the power generation device 10 to charge. When the system 60 or the load 70 is overloaded, the energy storage system 20 may provide power to the system 60 or the load 70 by discharging the charged power. In addition, the energy storage system 20 may be connected between the power generation device 10 and the inverter 30 so as to be electrically connected to the power generation device 10 and electrically connected to the inverter 30.

The system control unit 80 may control an operation of the energy storage system 20, the inverter 30, and the AC/AC converter 50. More specifically, the system control unit 80 may control charging and discharging of the energy storage system 20. When the system 60 or the load 70 is overloaded, the system control unit 80 may control so that the energy storage system 20 may supply power to transfer the electric power to the system 60 or the load 70. When the system 60 or the load 70 is light loaded, the system control unit 80 may control so that an external power supply source or the power generation device 10 may supply power to transfer it to the energy storage system 20.

Figure 2:
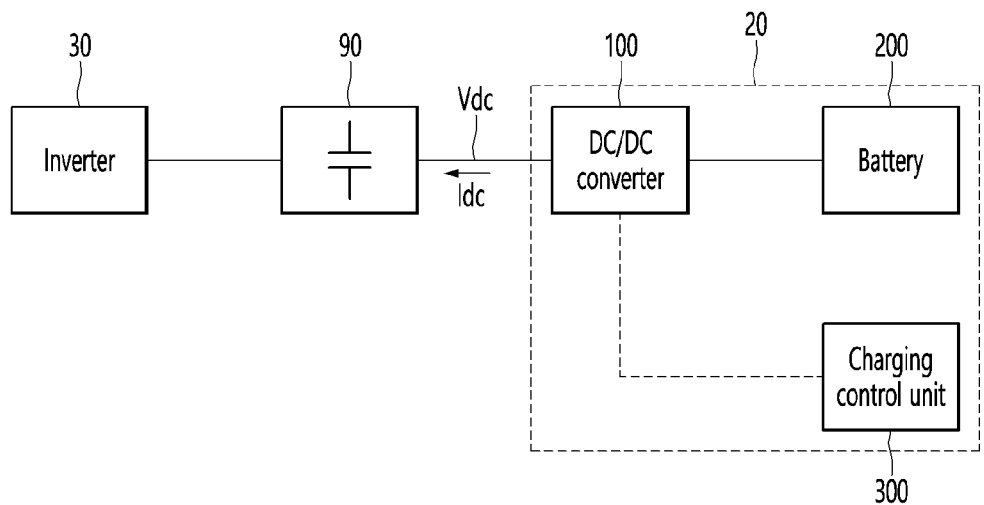
FIG. 2 is a view for describing an energy storage system according to one embodiment.

Hereinafter, the energy storage system will be described in more detail. FIG. 2 is a view for describing an energy storage system according to one embodiment.

Referring to FIG. 2, an energy storage system 20 according to one embodiment may include a DC/DC converter 100, a battery 200, and a charging control unit 300. Although not shown in FIG. 1, the energy storage system 20 may be connected to an inverter 30 via a DC link capacitor 90. That is, the DC link capacitor 90 may be disposed between the energy storage system 20 and the inverter 30. Accordingly, the energy storage system 20 may receive a DC voltage Vdc of the DC link capacitor 90 in a charging mode and provide the DC voltage Vdc to the DC link capacitor 90 in a discharging mode.

The battery 200 may receive charging power from the DC/DC converter 100 in the charging mode, and may perform a charging operation by the received power. In addition, the battery 200 may output power stored already to the DC/DC converter 100 in the discharging mode. Further, the battery 200 may include a plurality of battery cells for performing the charging operation and the discharging operation.

The charging control unit 300 may include a battery management system (BMS). The charging control unit 300 may provide battery state information on a state of the battery 200 to a system control unit 80. For example, the charging control unit 300 may monitor at least one of a voltage, current, temperature, remaining power, and charging state of the battery 200, and may transmit status information of the monitored battery 200 to the system control unit 80. In addition, the charging control unit 300 may allow a plurality of battery cells to maintain an appropriate voltage while charging or discharging. Further, the charging control unit 300 may operate based on a control signal of the system control unit 80. Furthermore, the charging control unit 300 may control the DC/DC converter 100 according to the status information of the monitored battery 200. In addition, the charging control unit 300 may control the DC/DC converter 100 according to the charging mode or the discharging mode. More specifically, the charging control unit 300 may provide a charge control signal or a discharge control signal for controlling the DC/DC converter 100 to a converter control unit of the DC/DC converter 100, and the converter control unit of the DC/DC converter 100 may provide a PWM signal to a switch of the DC/DC converter 100 based on the charge control signal or the discharge control signal. In addition, the charging control unit 300 may control the DC/DC converter 100 for initial charging of the DC link capacitor 90 in the discharging mode of the battery 200. That is, the charging control unit 300 may provide an initial charging control signal for controlling the DC/DC converter 100 to the converter control unit of the DC/DC converter 100, and the converter control unit of the DC/DC converter 100 may provide an initial charging switch signal to the switch of the DC/DC converter 100 based on the initial charging control signal. Further, the charging control unit 300 may control the DC/DC converter 100 to increase power conversion efficiency of the DC/DC converter 100. More specifically, the charging control unit 300 may provide a power conversion efficiency control signal that may increase the power conversion efficiency of the DC/DC converter 100 to the converter control unit of the DC/DC converter 100, and the converter control unit of the DC/DC converter 100 may provide the PWM signal to the switch of the DC/DC converter 100 based on the power conversion efficiency control signal.

The DC/DC converter 100 may convert a magnitude of DC power supplied by the energy storage system 20 in the charging mode or in the discharging mode. More specifically, the DC/DC converter 100 may convert the DC power supplied from a power generation device 10 or the inverter 30 to the DC link capacitor 90 into a voltage magnitude for charging the battery 200 to provide it to the battery 200. In addition, the DC/DC converter 100 may convert the DC power provided by the battery 200 into a voltage magnitude that the inverter 30 may use to provide it to the DC link capacitor 90.

<Initial Charging of DC Link Capacitor>

Figure 3:
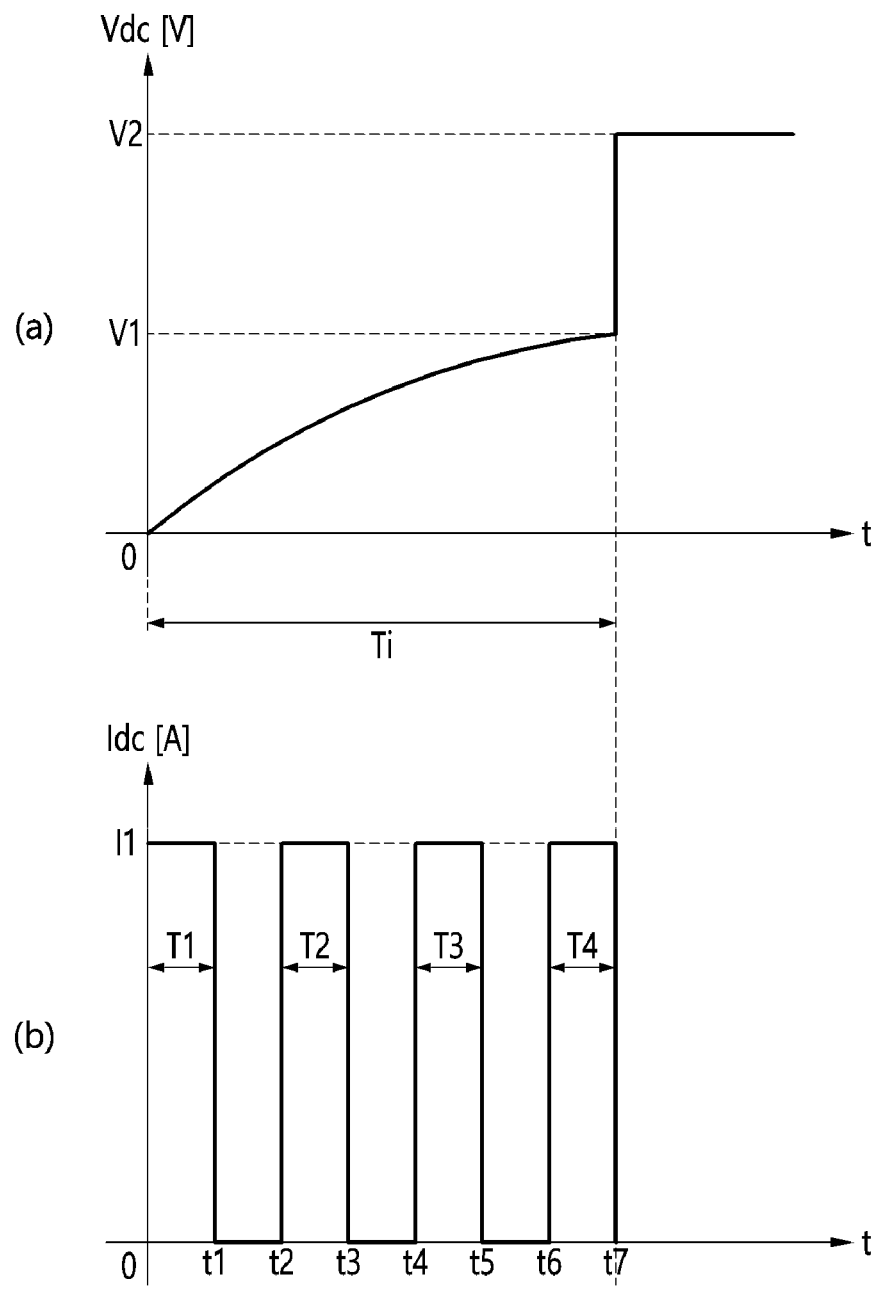
FIG. 3 is a graph illustrating a DC voltage and a DC current of a DC link capacitor during initial charging according to one embodiment.

FIG. 3 is a graph illustrating a DC voltage and a DC current of a DC link capacitor during initial charging according to one embodiment.

An energy storage system 20 according to one embodiment does not need a separate configuration for initial charging of a DC link capacitor 90 for a discharging mode operation. The energy storage system 20 may provide electric energy stored in a battery 200 to the DC link capacitor 90 by switching operation of a DC/DC converter 100 so that a DC voltage of the DC link capacitor 90 is initially charged up to an operating voltage of to an inverter 30. More specifically, the DC/DC converter 100 may provide a DC current Idc to the DC link capacitor 90. When the DC current Idc is provided, the DC link capacitor 90 is charged with electric charge, so that a DC voltage Vdc may increase. The DC/DC converter 100 may initially charge the DC voltage Vdc up to an operating voltage at which the inverter 30 may invert during an initial charging period. As an example, as shown in FIG. 3, the DC/DC converter 100 may turn on or turn off a switch during an initial charging period Ti to provide the DC current Idc of a predetermined level I1 for a plurality of periods T1, T2, T3, and T4. When the DC current Idc is continuously provided for the initial charging period Ti, since a difference in voltage between the inverter 30 and the DC/DC converter 100 is large, a problem of circuit damage may occur. Therefore, the DC/DC converter 100 may provide the DC current Idc to the DC link capacitor 90 for a plurality of periods. The plurality of periods in which the DC current Idc is provided may be all the same period. The embodiment is not limited thereto, and as the DC voltage Vdc increases, the difference in voltage between the inverter 30 and the DC/DC converter 100 decreases, thereby increasing the period of providing the DC current Idc. In this case, it is possible to reduce an initial charging time. As the DC current Idc is provided, the DC voltage Vdc increases. The DC/DC converter 100 terminates the initial charging when the DC voltage Vdc reaches an operating voltage V1, and performs a boosting operation of the discharging mode. When the DC/DC converter 100 performs the boosting operation, it is possible to reach a second DC voltage level V2.

Figure 14:
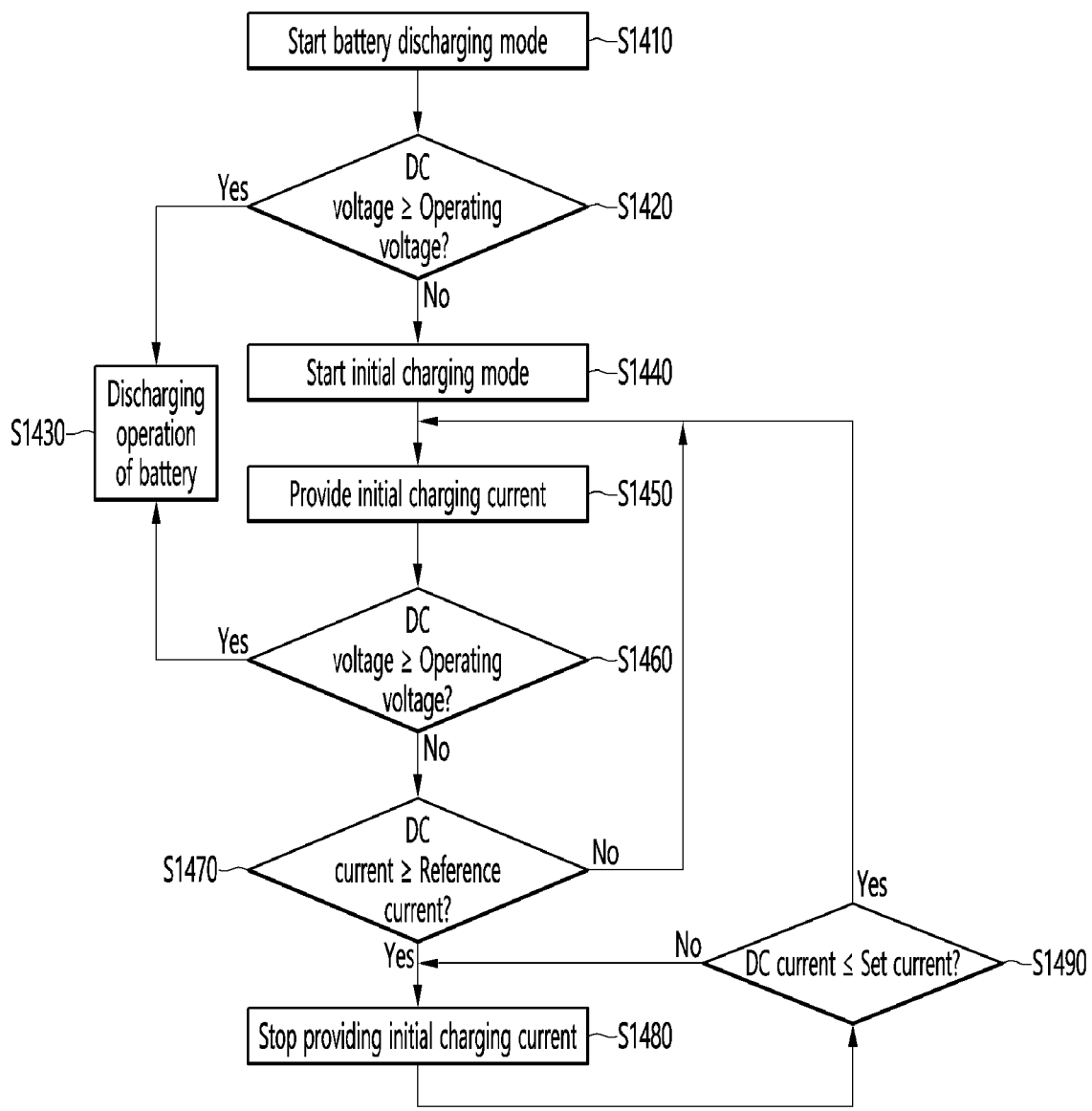
FIG. 14 is a view for describing an initial charging method of a DC link capacitor of a power supply system according to one embodiment.

In addition, a method of initial charging of the DC/DC converter 100 may include a method of an initial charging of a DC link capacitor of FIG. 14. Hereinafter, the initial charging of the DC link capacitor 90 will be described according to a specific embodiment of the DC/DC converter 100.

Figure 4:
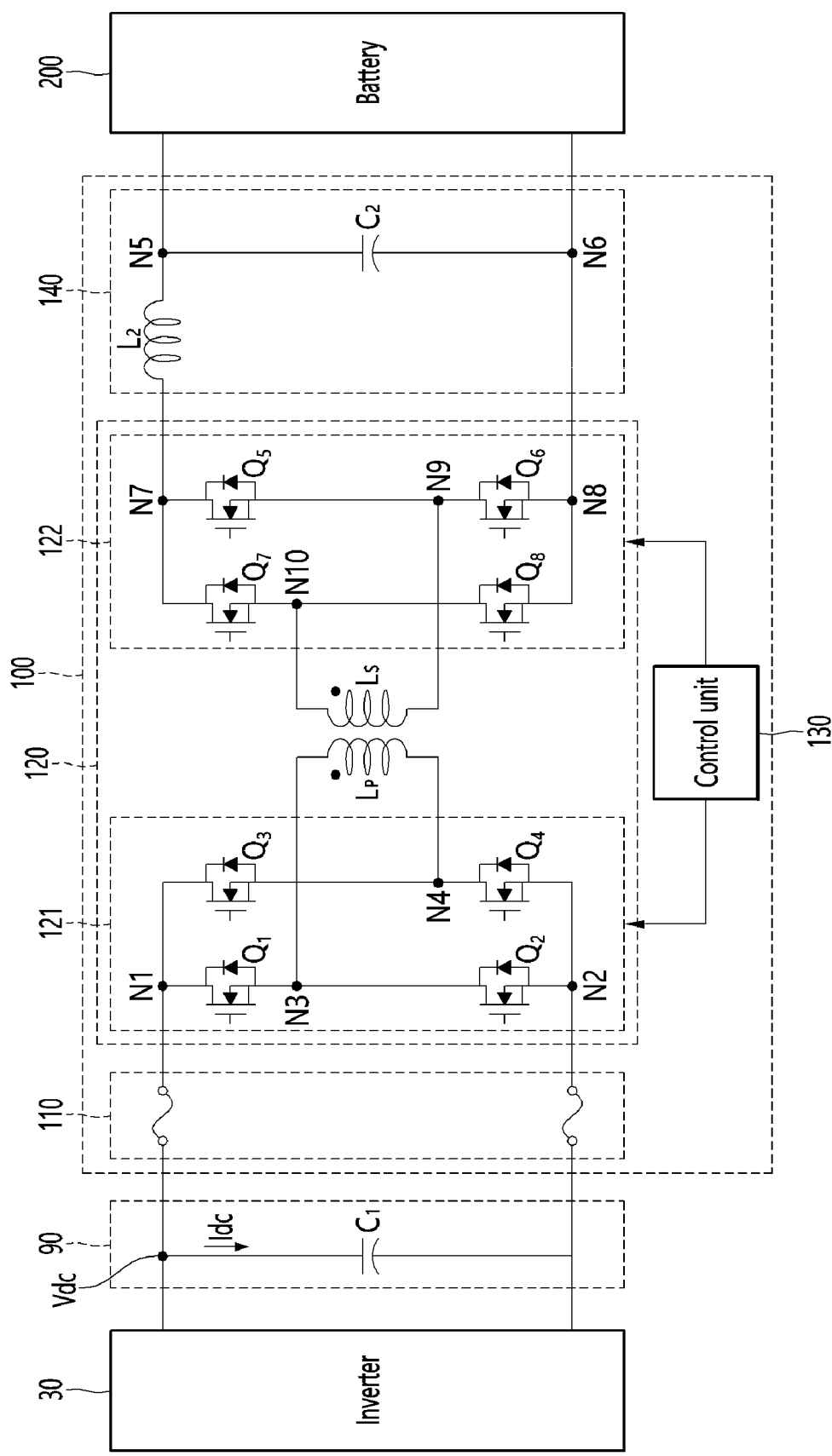
FIG. 4 is a circuit diagram of a DC/DC converter according to one embodiment.
Figure 5:
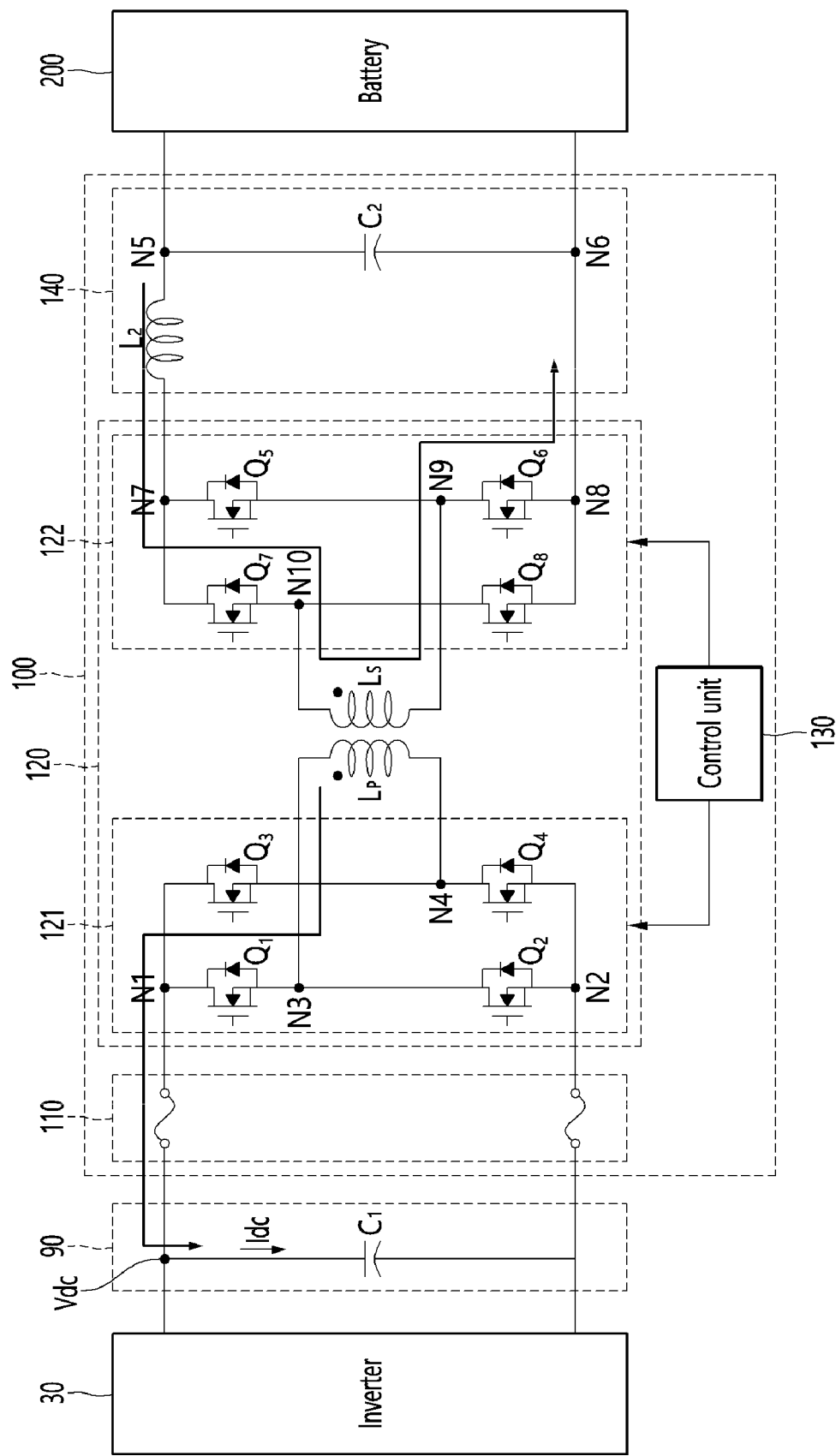
FIG. 5 illustrates an operation of the DC/DC converter of FIG. 4 for initial charging of a DC link capacitor.
Figure 6:
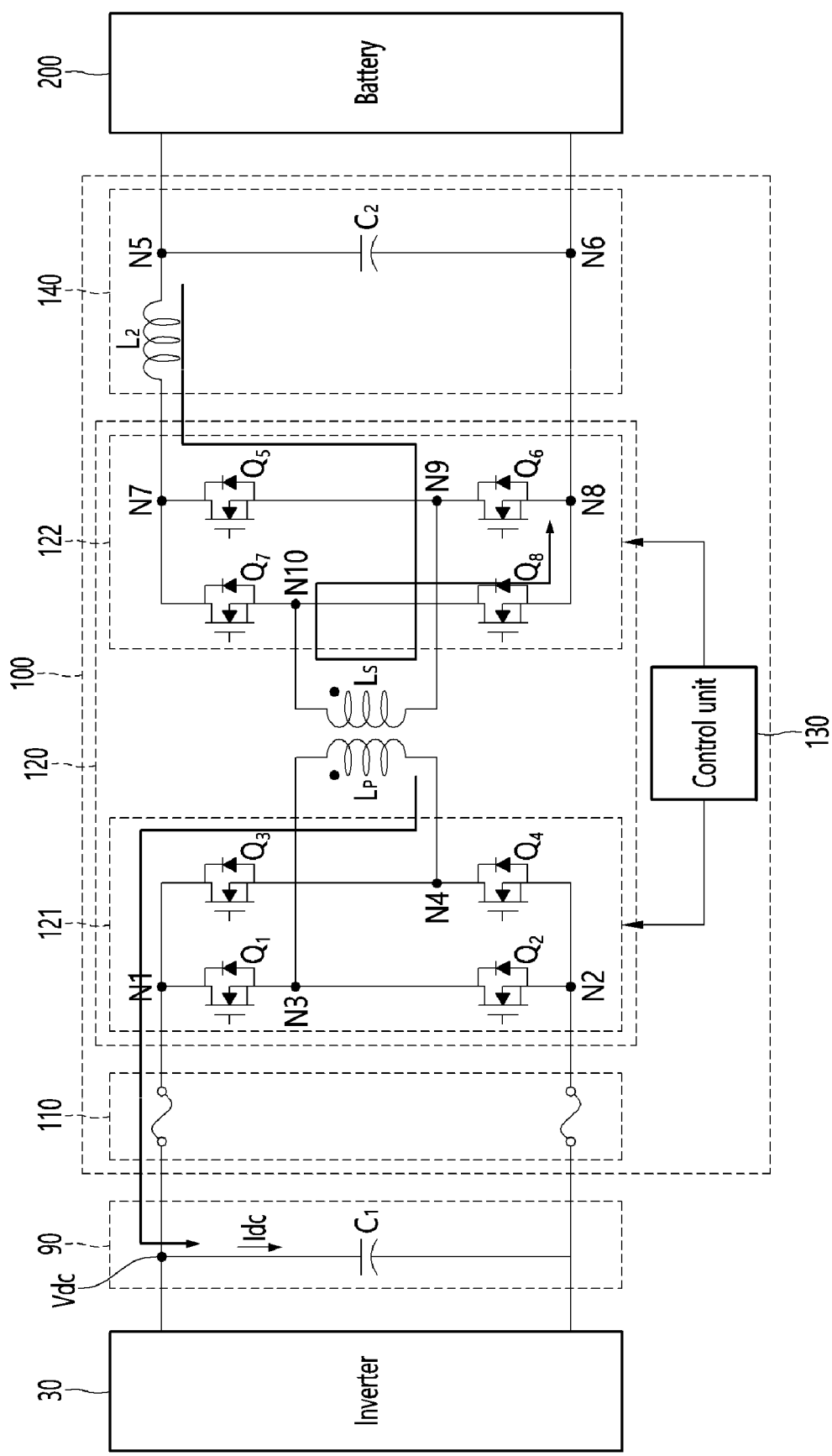
FIG. 6 illustrates an operation of the DC/DC converter of FIG. 4 for initial charging of a DC link capacitor.

FIG. 4 is a circuit diagram of a DC/DC converter according to one embodiment, and FIGS. 5 and 6 illustrate an operation of the DC/DC converter of FIG. 4 for initial charging of a DC link capacitor. Referring to FIG. 4, a DC/DC converter 100 according to one embodiment may be a bidirectional DC/DC converter, and may be an isolation type converter.

The DC/DC converter 100 according to one embodiment may include a control unit 130. The control unit 130 may generate a PWM signal based on a control signal provided from a charging control unit 300 to provide it to a bridge circuit unit 120 including a switch.

The DC/DC converter 100 according to one embodiment may include an overcurrent protection circuit unit 110. The overcurrent protection circuit unit 110 may prevent EOS or an overcurrent from flowing into an energy storage system 20 or flowing out to the outside thereof. The overcurrent protection circuit unit 110 may be disposed between a first terminal connected to a DC link capacitor 90 and the bridge circuit unit 120. In addition, the overcurrent protection circuit unit 110 may include a circuit breaker. In this case, the overcurrent protection circuit unit 110 may open between the first terminal and the bridge circuit unit 120 when EOS or an overcurrent flows into the energy storage system 20. Accordingly, the overcurrent protection circuit unit 110 may block input/output of current to/from the energy storage system 20 and the outside thereof.

The DC-DC converter 100 according to one embodiment may include the bridge circuit unit 120. The bridge circuit unit 120 may include a transformer T, a first full bridge circuit 121, and a second full bridge circuit 122. In addition, the bridge circuit unit 120 may be divided into a primary circuit at a left side thereof and a secondary circuit at a right side thereof based on the transformer T including first and second coils Lp and Ls, and the primary circuit may include switching elements Q1 to Q4 constituting the first full bridge circuit 121. In addition, the secondary circuit may include a DC stabilization circuit unit 140 including a second capacitor C2 and a second inductor L2 and the second full bridge circuit 122 including switching elements Q5 to Q8. The DC stabilization circuit unit 140 may be connected to a second terminal to which a battery 200 is connected.

In the primary circuit, the first coil Lp is connected between a third node N3 and a fourth node N4. In addition, the first full bridge circuit 121 includes a first leg and a second leg between first and second nodes N1 and N2, wherein the first leg includes a first switching element Q1 connected between the first and third nodes N1 and N3 and a second switching element Q2 connected between the third and second nodes N3 and N2, and the second leg includes a third switching element Q3 connected between the first and fourth nodes N1 and N4 and a fourth switching element Q4 connected between the fourth and second nodes N4 and N2.

In the secondary circuit, the battery 200 and the second capacitor C2 are connected between fifth and sixth nodes N5 and N6, the second inductor L2 is connected between fifth and seventh nodes N5 and N7, and the second coil Ls is connected between tenth and ninth nodes N10 and N9. In addition, the second full bridge circuit 122 includes a third leg and a fourth leg between seventh and eighth nodes N7 and N8, wherein the third leg includes a fifth switching element Q5 connected between the seventh and ninth nodes N7 and N9 and a sixth switching element Q6 connected between the ninth and eighth nodes N9 and N8, and the fourth leg includes a seventh switching element Q7 connected between the seventh and tenth nodes N7 and N10 and an eighth switching element Q8 connected between the tenth and eighth nodes N10 and N8.

The DC-DC converter 100 according to one embodiment is a bidirectional converter. In a step down mode, a DC output voltage is output to the fifth and sixth nodes N5 and N6 by stepping down a DC input voltage on the first and second nodes N1 and N2, and in a step up mode, a DC output voltage is output to the first and second nodes N1 and N2 by stepping up a DC input voltage on the fifth and sixth nodes N5 and N6.

The DC-DC converter 100 according to one embodiment may perform a switching operation of the first full bridge circuit 121 and the second full bridge circuit 122 for initial charging of the DC link capacitor 90 for the discharging mode to provide a DC current Idc to the DC link capacitor 90. As an example, referring to FIG. 5, a Nth (N is a natural number) DC current Idc of a plurality of DC currents Idc provided in the initial charging may be provided by turning on the seventh switching element Q7 and the sixth switching element Q6 and turning off the fifth switching element Q5 and the eighth switching element Q8 of the second full bridge circuit 122, and by turning on the first switching element Q1 and the fourth switching element Q4 and turning off the second switching element Q2 and the third switching element Q3 of the first full bridge circuit 121.

Referring to FIG. 6, a N+1th (N is a natural number) DC current Idc of the plurality of DC currents Idc provided in the initial charging may be provided by turning on the fifth switching element Q5 and the eighth switching element Q8 and turning off the sixth switching element Q6 and the seventh switching element Q7 of the second full bridge circuit 122, and by turning on the third switching element Q3 and the second switching element Q2 and turning off the first switching element Q1 and the fourth switching element Q4 of the first full bridge circuit 121.

Figure 7:
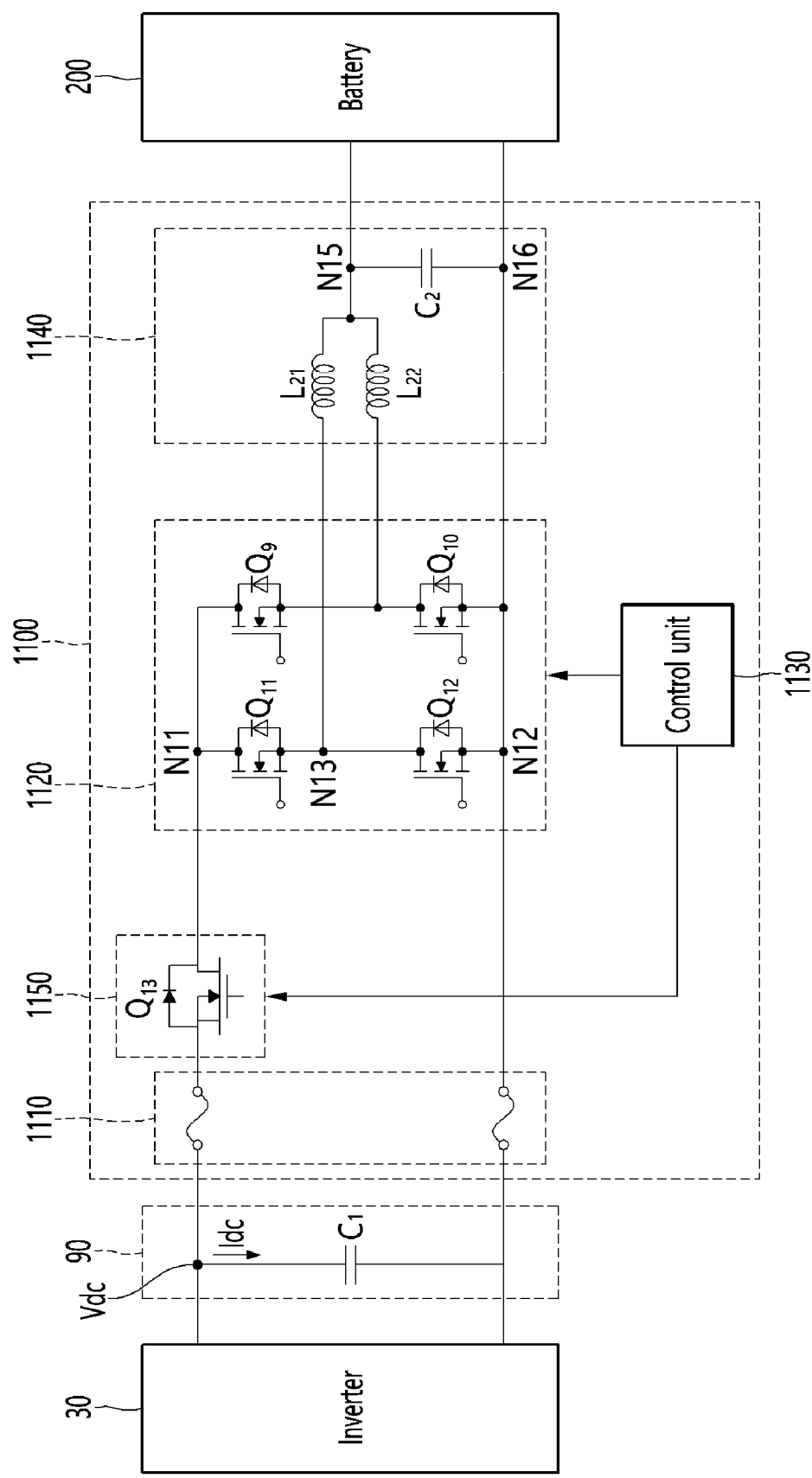
FIG. 7 is a circuit diagram of a DC/DC converter according to another embodiment.
Figure 8:
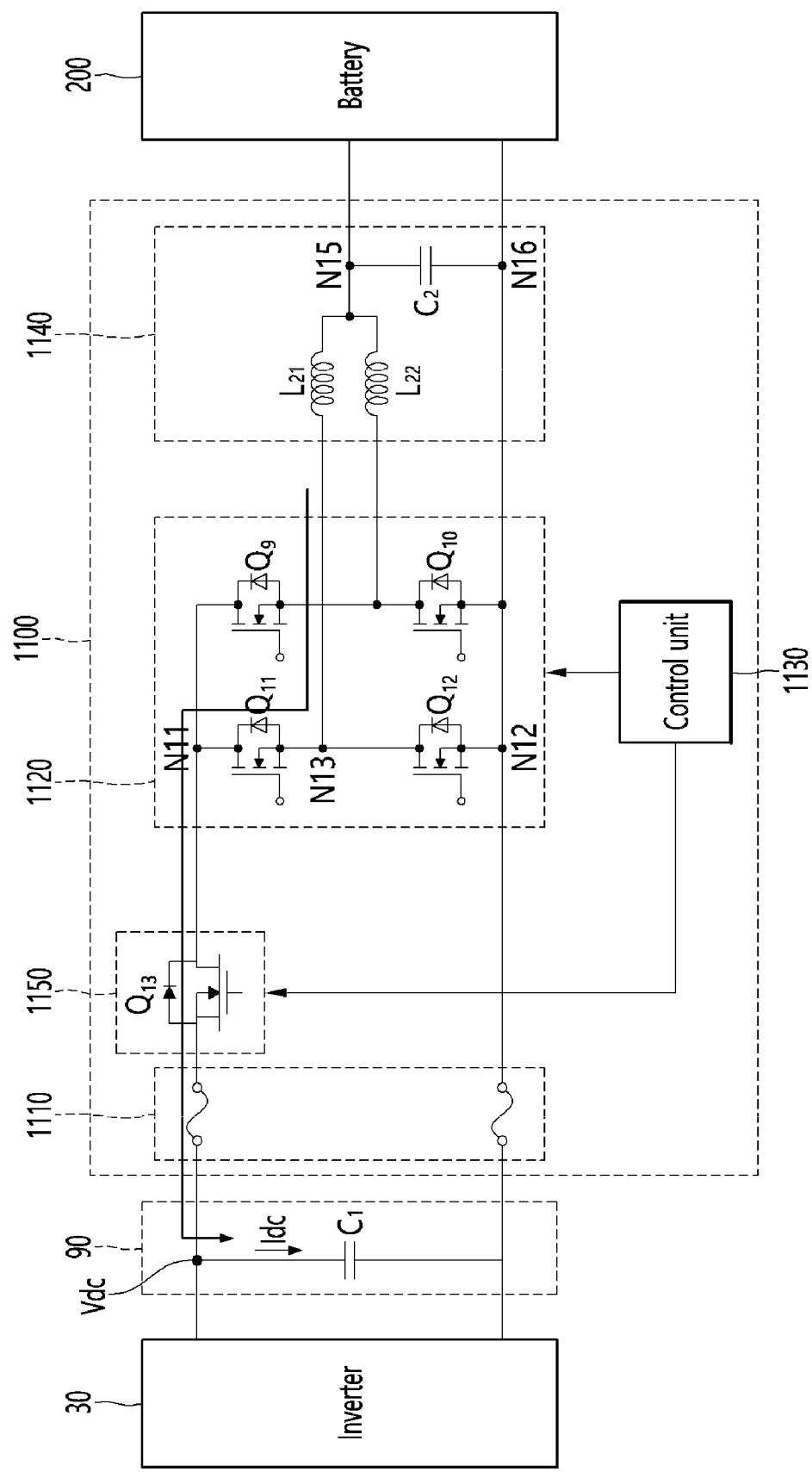
FIG. 8 illustrates an operation of the DC/DC converter of FIG. 7 for initial charging of a DC link capacitor.
Figure 9:
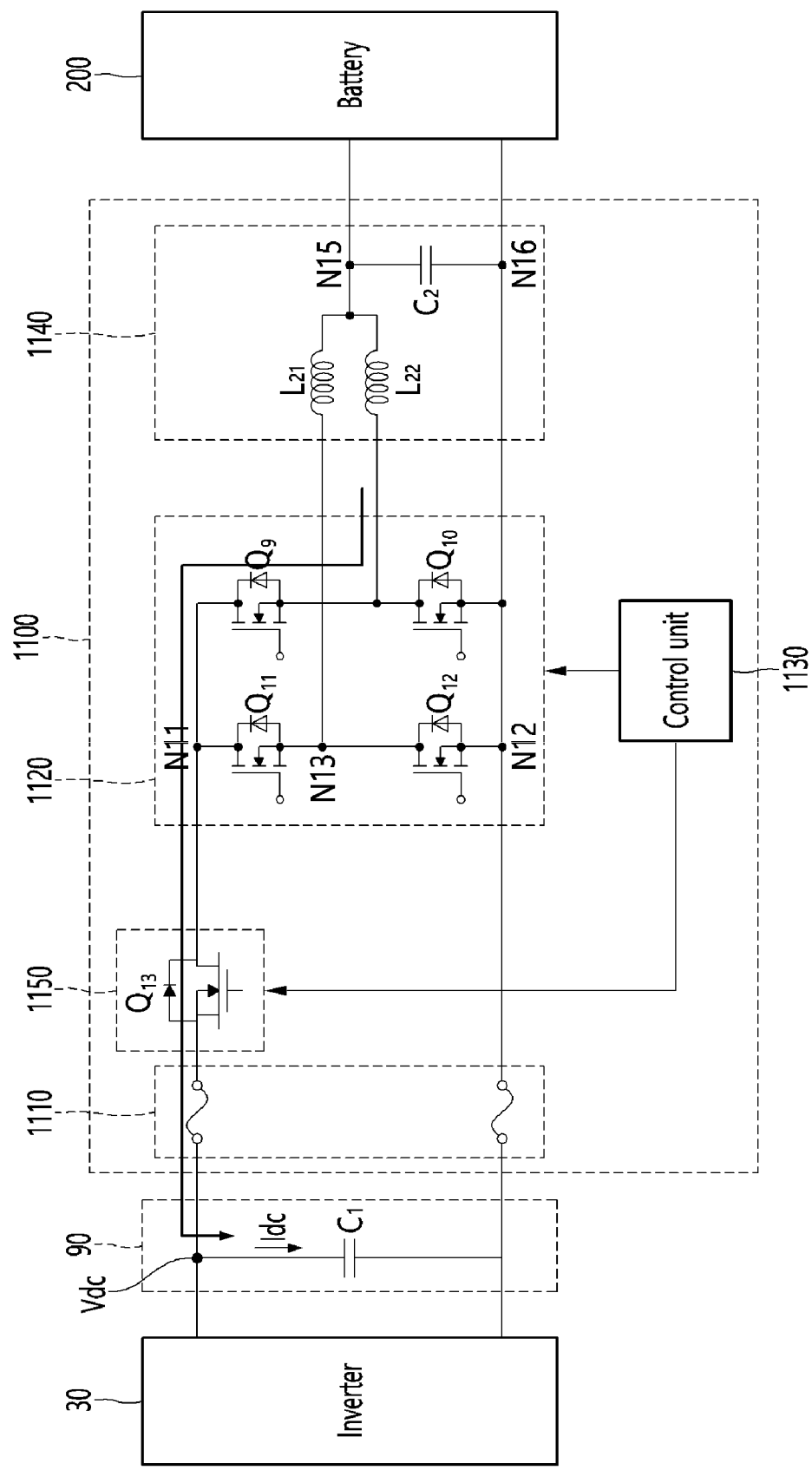
FIG. 9 illustrates an operation of the DC/DC converter of FIG. 7 for initial charging of a DC link capacitor.

FIG. 7 is a circuit diagram of a DC/DC converter according to another embodiment, and FIGS. 8 and 9 illustrate an operation of the DC/DC converter of FIG. 7 for initial charging of a DC link capacitor. Referring to FIG. 7, a DC/DC converter 1100 according to another embodiment is a bidirectional DC/DC converter, and may be a non-isolation type converter. The DC/DC converter 1100 according to another embodiment may include a control unit 1130. The control unit 1130 may generate a PWM signal based on a control signal provided from a charging control unit 300 to provide it to a top switch unit 1150 or a bridge circuit unit 1120 including a switch.

The DC/DC converter 1100 according to another embodiment may include an overcurrent protection circuit unit 1110. The overcurrent protection circuit unit 1110 may prevent EOS or an overcurrent from flowing into an energy storage system 20 or flowing out to the outside thereof. The overcurrent protection circuit unit 1110 may be disposed between a first terminal connected to a DC link capacitor 90 and the top switch unit 1150. In addition, the overcurrent protection circuit unit 1110 may include a circuit breaker. In this case, the overcurrent protection circuit unit 1110 may open between the first terminal and the top switch unit 1150 when EOS or an overcurrent flows into the energy storage system 20. Accordingly, the overcurrent protection circuit unit 1110 may block input/output of current to/from the energy storage system 20 and the outside thereof.

The DC/DC converter 1100 according to another embodiment may include the top switch unit 1150. The top switch unit 1150 may be disposed between the overcurrent protection circuit unit 1110 and the bridge circuit unit 1120. Further, the top switch unit 1150 may include a thirteenth switching element Q13.

The DC/DC converter 1100 according to another embodiment may include the bridge circuit unit 1120. The bridge circuit unit 1120 may be disposed between the top switch unit 1150 and a DC stabilization circuit unit 1140. The bridge circuit unit 1120 may include ninth to twelfth switching elements Q9 to Q12.

The DC/DC converter 1100 according to another embodiment may include the DC stabilization circuit unit 1140. The DC stabilization circuit unit 1140 may include a second-first inductor L21, a second-second inductor L22, and a second capacitor C2. The DC stabilization circuit unit 1140 may be connected to a second terminal to which a battery 200 is connected.

The top switch unit 1150 is connected between one side of the overcurrent protection circuit unit 1110 and an eleventh node N11. The battery 200 and the second capacitor C2 are connected between fifteenth and sixteenth nodes N15 and N16, the second-first inductor L2-1 is connected between fifteenth and thirteenth nodes N15 and N13, and the second-second inductor L2-2 is connected between fifteenth and fourteenth nodes N15 and N14. The bridge circuit unit 1120 includes an eleventh leg and a twelfth leg between eleventh and twelfth nodes N11 and N12, wherein the eleventh leg includes an eleventh switching element Q11 connected between the eleventh and thirteenth nodes N11 and N13 and a twelfth switching element Q12 connected between the thirteenth and twelfth nodes N13 and N12, and the twelfth leg includes a ninth switching element Q9 connected between the eleventh and fourteenth nodes N11 and N14 and a tenth switching element Q10 connected between the fourteenth and twelfth nodes N14 and N12.

The DC-DC converter 1100 according to another embodiment is a bidirectional converter. In a step down mode, a DC output voltage is output to the fifteenth and sixteenth nodes N15 and N16 by stepping down a DC input voltage on the DC link capacitor 90, and in the step up mode, a DC output voltage is output to the DC link capacitor 90 by stepping up a DC input voltage on the fifteenth and sixteenth nodes N15 and N16.

The DC-DC converter 1100 according to another embodiment may perform a switching operation of the top switch unit 1150 and the bridge circuit unit 1120 for initial charging of the DC link capacitor 90 for the discharging mode to provide a DC current Idc to the DC link capacitor 90. As an example, referring to FIG. 8, a Nth (N is a natural number) DC current Idc of a plurality of DC currents Idc provided in the initial charging may be provided by turning on the eleventh switching element Q11 and turning off the ninth switching element Q9, the tenth switching element Q10, and the twelfth switching element Q12 of the bridge circuit unit 1120, and by turning on the thirteenth switching element Q13 of the top switch unit 1150.

Referring to FIG. 9, a N+1th (N is a natural number) DC current Idc of the plurality of direct current Idc provided in the initial charging may be provided by turning on the ninth switching element Q9 and turning off the eleventh switching element Q11, the tenth switching element Q10, and the twelfth switching element Q12 of the bridge circuit unit 1120, and by turning on the thirteenth switching element Q13 of the top switch unit 1150. In addition, the thirteenth switching element Q13 of the top switch unit 1150 may be turned off while the direct current Idc for the initial charging is not provided.

Figure 10:
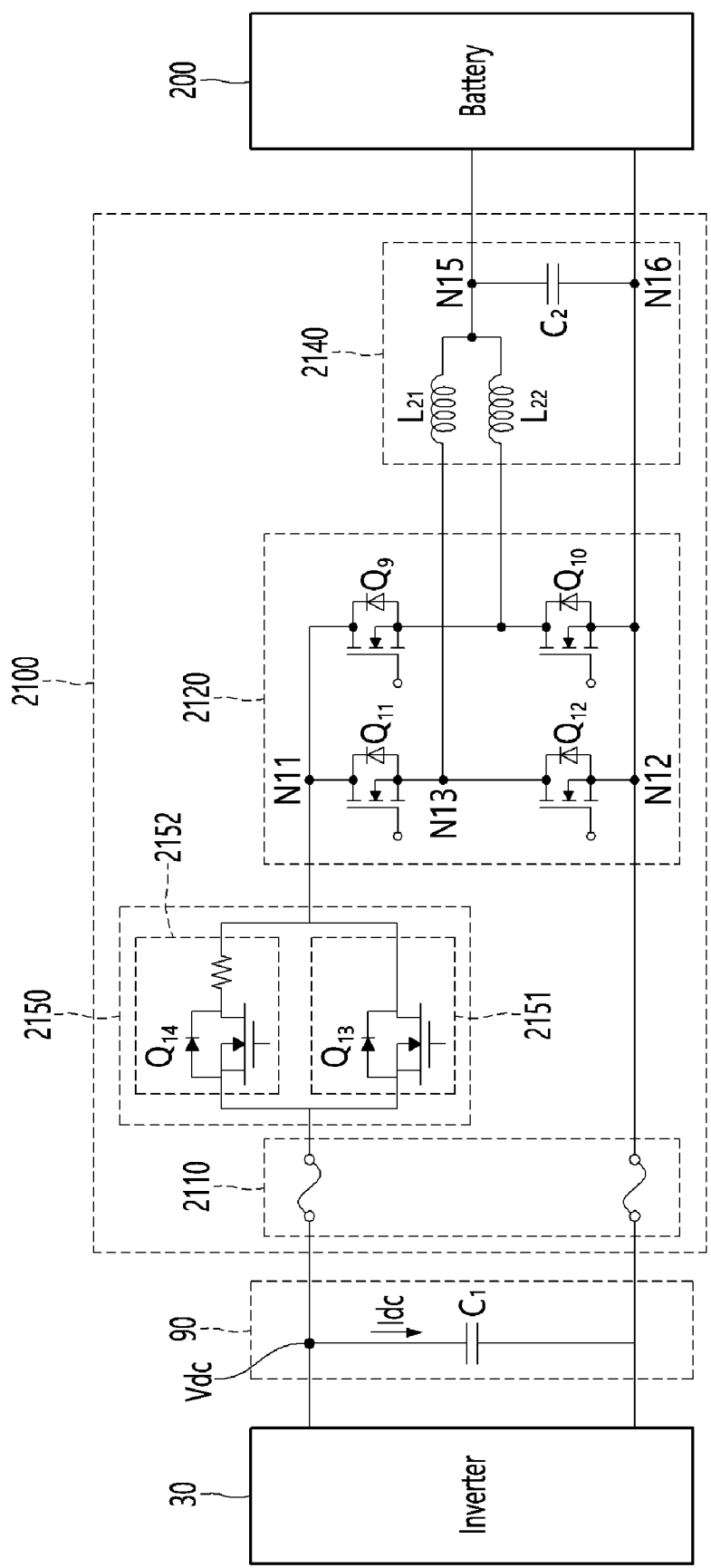
FIG. 10 is a circuit diagram of a DC/DC converter according to still another embodiment.

FIG. 10 is a circuit diagram of a DC/DC converter according to still another embodiment. Referring to FIG. 10, the DC/DC converter of FIG. 10 is the same as the DC/DC converter according to another embodiment of FIG. 7 except for a top switch unit 2150. Therefore, description of the same configuration as the DC/DC converter of FIG. 7 is omitted.

The top switch unit 2150 according to still another embodiment may include a main switch unit 2151 and an initial charging switch unit 2152. The main switch unit 2151 may include a thirteenth switching element Q13 disposed between one end of an overcurrent protection circuit unit 2110 and an eleventh node N11. The initial charging switch unit 2152 may be connected in parallel with the main switch unit 2151. The initial charging switch unit 2152 may include a fourteenth switching element Q14 and a resistor R. One side of the fourteenth switching element Q14 may be connected to one end of the overcurrent protection circuit unit 2110 and the other side thereof may be connected to one side of the resistor R. The one side of the resistor R may be connected to the other side of the fourteenth switching element Q14, and the other side thereof may be connected to the eleventh node N11. The resistor R allows a current having a lower level than a current flowing through the main switch unit 2151 to flow through the initial charging switch unit 2152.

In the DC/DC converter 2100 according to still another embodiment, when performing a step down mode operation that is a charging mode or a step up mode operation that is a discharging mode, it is possible to maintain a state in which the main switch unit 2151 is turned on/off and the initial charging switch unit 2152 is turned off. In addition, in the DC/DC converter 1100, it is possible to maintain a state in which the main switch unit 2151 is turned off and the initial charging switch unit 2152 is turned on/off in an initial charging mode before starting the discharging mode. That is, in the DC/DC converter 2100 according to still another embodiment, when initially charging a DC link capacitor 90, an operation of a bridge circuit unit 2120 may be the same as that of the bridge circuit unit 1120 of the DC/DC converter 1100 of FIG. 7.

Therefore, the energy storage system according to the embodiment may initially charge the DC link capacitor before operating the discharging mode without a separate configuration. In addition, the energy storage system according to the embodiment may gradually increase the DC current provided to the DC link capacitor to accelerate an initial charging speed and perform quickly a discharging operation of a battery.

<Converter Efficiency Control>

Figure 11:
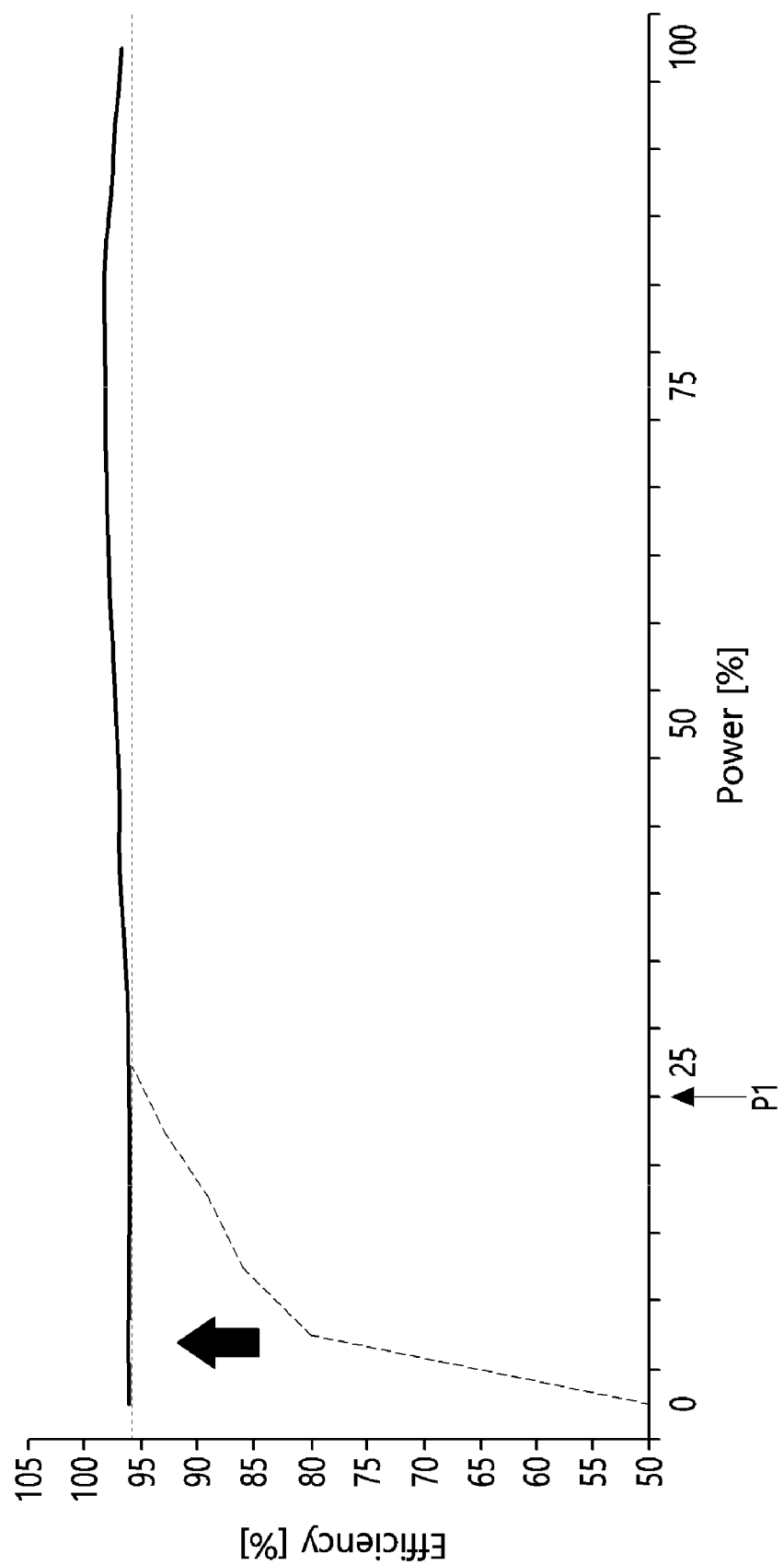
FIG. 11 is a graph showing a power conversion ratio according to an output power ratio in DC-to-DC power conversion of an energy storage system according to one embodiment.
Figure 12:
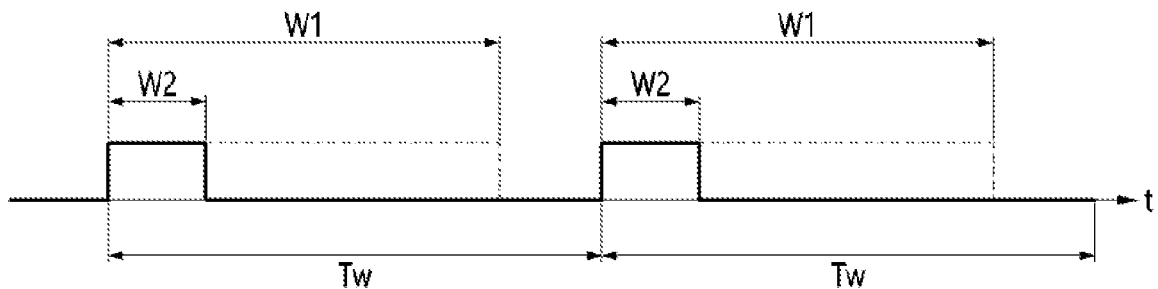
FIG. 12 is a view for describing a control method of a pulse width of a DC/DC converter of an energy storage system according to one embodiment.
Figure 13:
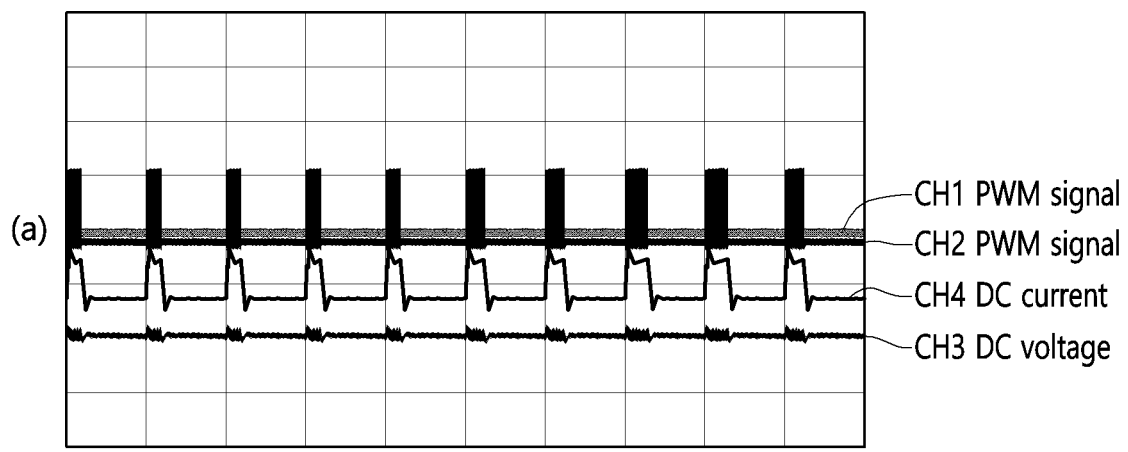
FIG. 13 is a view for describing a signal according to output power of an energy storage system according to one embodiment.
Figure 13:
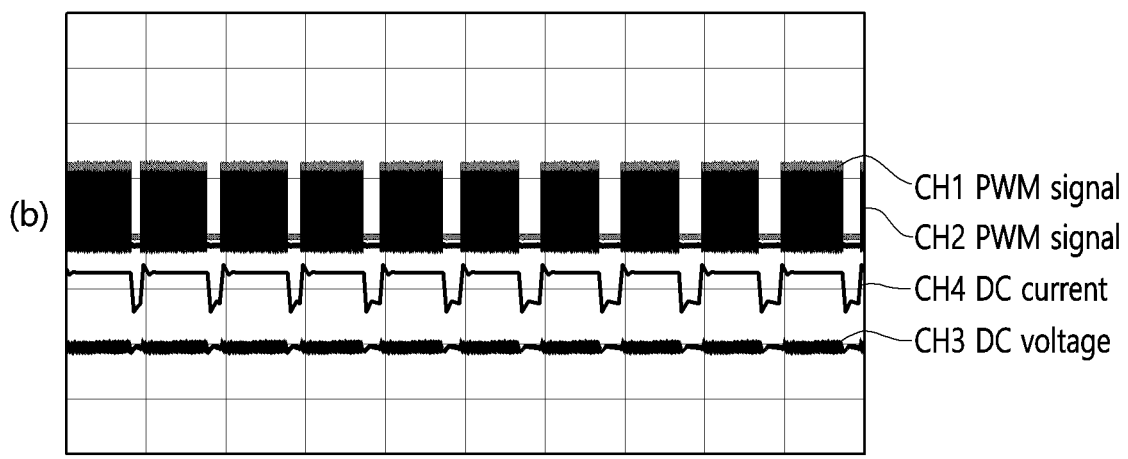

FIG. 11 is a graph showing a power conversion ratio according to an output power ratio in DC-to-DC power conversion of an energy storage system according to one embodiment. FIG. 12 is a view for describing a control method of a pulse width of a DC/DC converter of an energy storage system according to one embodiment, and FIG. 13 is a view for describing a signal according to output power of an energy storage system according to one embodiment.

Referring to FIG. 11, generally, in a DC/DC converter, power conversion efficiency (dotted line) is drastically lowered when output power becomes a predetermined ratio P1 or less during power conversion. For example, in the DC/DC converter, the power conversion efficiency is drastically lowered to 95% or less when converting power with less than 25% of maximum output power.

The energy storage system 20 according to one embodiment may maintain the power conversion efficiency (solid line) at a predetermined efficiency even when the output power of the DC/DC converter becomes the predetermined ratio P1 or less. For example, the DC/DC converter may maintain a power conversion efficiency of 95% when converting power with less than 25% of the maximum output power. To this end, the DC/DC converter 100 may provide a DC current Idc having a high power conversion efficiency when the DC/DC converter 100 becomes the predetermined ratio P1 or less of the maximum output power during power conversion. In this case, the output power may be adjusted by controlling a pulse width of a PWM signal controlling the DC/DC converter 100. In addition, the DC current Idc provided at the predetermined ratio P1 or less of the maximum output power has a problem that a current ripple increases as an intensity increases, and thus the current intensity may be set to satisfy a predetermined ripple range. More specifically, referring to FIG. 12, the DC/DC converter 100 may be provided with a PWM signal used for power conversion from a converter control unit during operation of a charging mode or a discharging mode. A pulse width of the PWM signal may be set to a first pulse width W1 during one period Tw when the DC/DC converter 100 outputs the output power at the predetermined ratio P1 or more of the maximum output power. In this case, an intensity of the output power may be adjusted by adjusting the intensity of the DC current Idc. In addition, the pulse width of the PWM signal may be adjusted to a second pulse width W2 during one period Tw when the DC/DC converter 100 outputs the output power less than the predetermined ratio P1 of the maximum output power. In this case, the intensity of the output power may be adjusted by maintaining the intensity of the DC current Idc of which power conversion efficiency is greater than or equal to the predetermined efficiency and adjusting the pulse width of the PWM signal. As an example, referring to FIG. 13, (a) shows a case in which the DC/DC converter 100 outputs an output power of 300 W, and (b) shows a case in which the DC/DC converter 100 outputs an output power of 900 W. The DC/DC converter 100 of (a) and (b) is maintained at the intensity of the DC current Idc of which power conversion efficiency is greater than or equal to the predetermined efficiency, and the pulse widths of the PWM signals are different from each other. That is, in the PWM signal of the DC/DC converter 100, a pulse width for outputting power of 900 W is larger than a pulse width for outputting power of 300 W.

Figure 15:
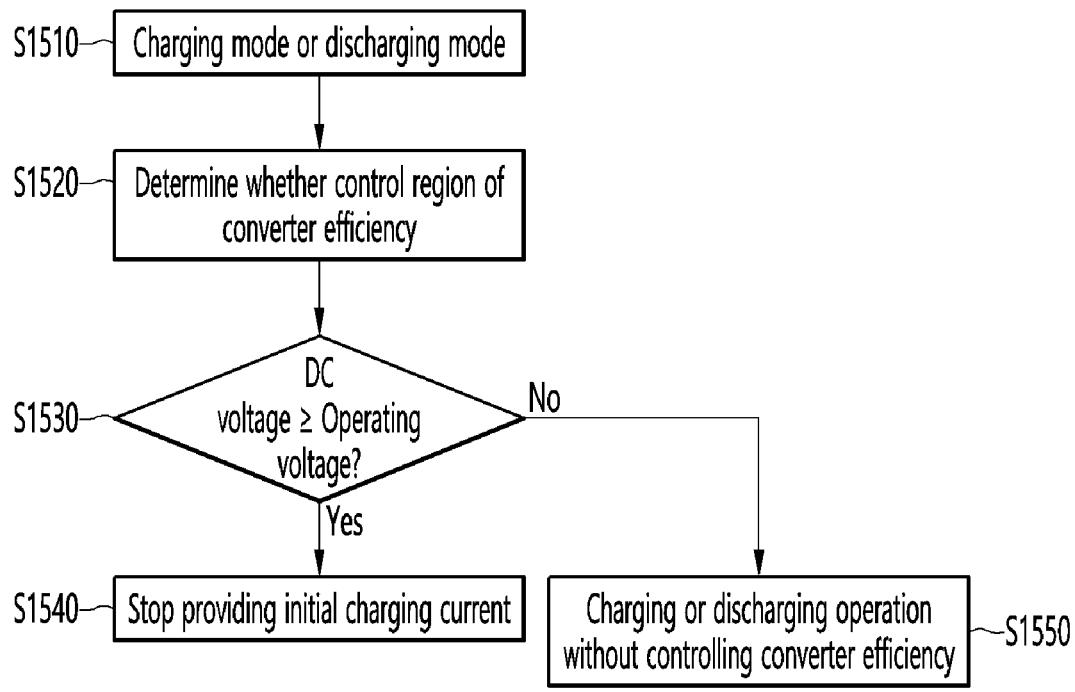
FIG. 15 is a view for describing a power supply method of an energy storage system according to one embodiment.
Figure 16:
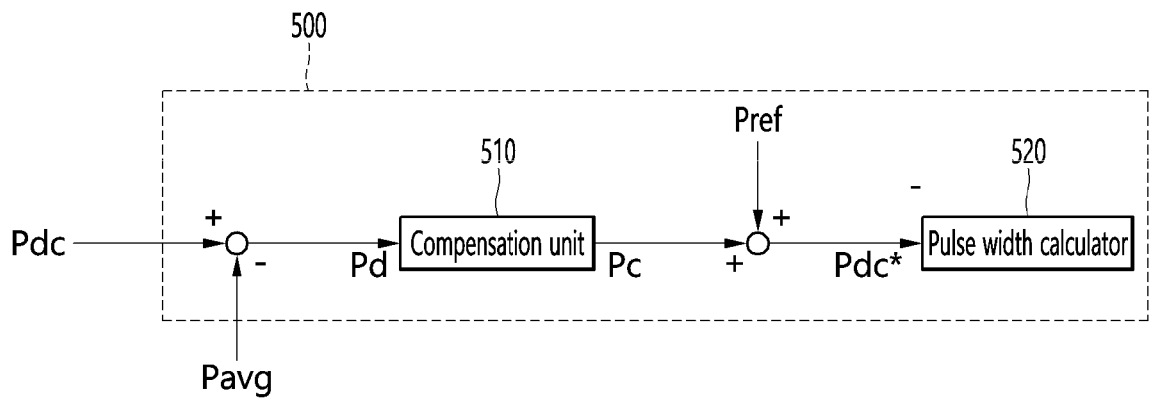
FIG. 16 is a view for describing a configuration of a converter efficiency control unit applied to an energy storage system of a power supply system according to one embodiment.
Figure 17:
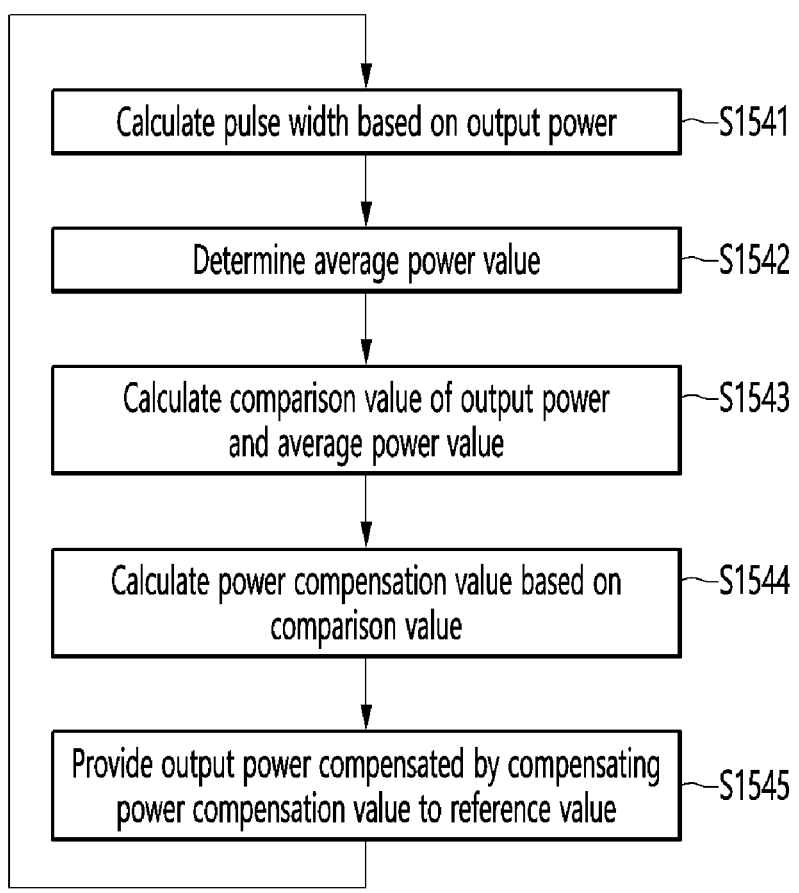
FIG. 17 is a view for describing a control method of power conversion efficiency of a DC/DC converter of an energy storage system according to one embodiment.

In addition, a method of controlling the power conversion efficiency of the DC/DC converter 100 may include a control method of converter efficiency of FIGS. 15 to 17. Therefore, the energy storage system according to one embodiment may have excellent power conversion efficiency of the DC/DC converter. In addition, the energy storage system according to one embodiment has excellent power conversion efficiency of the DC/DC converter, so that energy efficiency to be transferred when a battery is charged or discharged may be high.

FIG. 14 is a view for describing an initial charging method of a DC link capacitor of a power supply system according to one embodiment. Referring to FIG. 14, the power supply system may include starting a battery discharging mode of the energy storage system (S1410). That is, a system control unit may transmit a command signal informing an operation of the discharging mode to the energy storage system.

The power supply system may include determining whether a DC voltage is greater than or equal to an operating voltage (S1420). More specifically, the charging control unit of the energy storage system may determine whether a DC voltage of the DC link capacitor is greater than or equal to an operating voltage capable of performing an inverting operation of an inverter.

The power supply system may include performing a discharging operation of a battery (S1430) when the DC voltage is greater than or equal to the operating voltage (Yes in S1420). More specifically, the DC/DC converter may perform a boosting operation and increase the DC input voltage provided from the battery to provide the DC voltage to the DC link capacitor.

The power supply system may include starting an initial charging mode (S144) when the DC voltage is less than the operating voltage (No in S1420). The power supply system may include providing an initial charging current to the DC link capacitor when starting the initial charging mode (S1450). That is, the DC/DC converter of the energy storage system may provide a DC current to the DC link capacitor using electric energy of the battery. In this case, a method in which the DC/DC converter of FIGS. 3 to 10 initially charges the DC link capacitor may be used.

While the initial charging current is being provided, the power supply system may include determining whether the DC voltage is greater than or equal to the operating voltage (S1460). In this case, when the DC voltage is greater than or equal to the operating voltage (Yes in S1460), the DC/DC converter may terminate the initial charging mode and perform the discharging operation of the battery (S1430).

While the initial charging current is being provided, the power supply system may include determining whether the DC current is greater than or equal to a reference current when the DC voltage is less than the operating voltage (S1470). The reference current may be a preset current. The reference current may be a sufficient current intensity to charge the DC link capacitor. In addition, since a voltage difference between an inverter side and a battery side is large, the reference current may be set to a predetermined intensity or less because a circuit damage due to an inrush current may occur when the reference current is greater than or equal to the predetermined intensity. The power supply system may stop providing the initial charging current (S1480) when the DC current is greater than or equal to the reference current (Yes in S1470). In this case, a switch of the DC/DC converter is turned off and the DC current is not provided to the DC link capacitor. On the contrary, the power supply system may provide continuously the initial charging current when the DC current is less than the reference current.

After stopping provision of the initial charging current, the power supply system may include determining whether the DC current is less than or equal to a set current (S1490). The set current may be a preset current. The set current may be smaller than the reference current. As an example, the set current may be OA. The power supply system may stop continuously providing the initial charging current when the DC current is not less than or equal to the set current (No in S1490). On the contrary, the power supply system may provide the initial charging current when the DC current is less than or equal to the set current (Yes in S1490). That is, the power supply system may perform stably the initial charging of the DC link capacitor by performing the initial charging according to the magnitude of the DC current provided to the DC link capacitor.

FIG. 15 is a view for describing a power supply method of an energy storage system according to one embodiment, FIG. 17 is a view for describing a control method of power conversion efficiency of a DC/DC converter of an energy storage system according to one embodiment, and FIG. 16 is a view for describing a configuration of a converter efficiency control unit applied to an energy storage system of a power supply system according to one embodiment.

Referring to FIG. 15, the power supply method according to one embodiment may include operating the energy storage system in a charging mode or a discharging mode (S1510). The power supply method may include determining whether it is in a control region of converter efficiency (S1520). That is, the energy storage system may determine whether it is necessary to control power conversion efficiency of the DC/DC converter. In this case, the energy storage system may determine whether output power is less than a reference power (S1530). The output power may be power that the DC/DC converter currently outputs. The reference power may be output power at which the power conversion efficiency of the DC/DC converter becomes a predetermined efficiency. The reference power may be set in advance. For example, the reference power may be a power that is a predetermined ratio of maximum output power of the DC/DC converter. As an example, the reference power may be 25% power of the maximum output power of the DC/DC converter.

When the output power is not less than the reference power (No in S1530), a charging operation or a discharging operation may be performed without controlling converter efficiency (S1550). When the output power becomes less than the reference power (Yes in S1530), the energy storage system may include controlling converter efficiency (S1540). More specifically, referring to FIG. 17, the controlling of converter efficiency may include calculating a pulse width based on the output power (S1541). More specifically, the calculating of the pulse width may use Equation 1.

(Equation 1)

For example, converter efficiency may be controlled up to 25% of output power of a DC/DC converter having maximum output power of 5 kW, and a pulse width of 1 kW may be calculated by setting a repetition period of a PWM signal to 2 ms. In this case, the pulse width of 1 kW may be 1.6 ms, which is 1 kW/(5 kW*25%)*2 ms.

In addition, the controlling of the converter efficiency may determine an average power value (S1542). The average power value may be calculated by measuring an output power value during a predetermined number of repetition periods of the PWM signal by a charging control unit. Thereafter, the controlling of the converter efficiency may calculate a comparison value between the output power and the average power value (S1543). That is, the comparison value may be a value obtained by subtracting the average power value from the output power. As an example, referring to FIG. 16, the energy storage system 20 may include a converter efficiency control unit 500. The converter efficiency control unit 500 may be included in the charging control unit 300, but the embodiment is not limited thereto. The converter efficiency control unit 500 may calculate a power difference value Pd by comparing output power Pdc with an average power value Pavg. Thereafter, the controlling of the converter efficiency may calculate a power compensation value based on a comparison value (S1544). As an example, the converter efficiency control unit 500 may include a compensation unit 510. The compensation unit 510 may be a PI controller. The compensation unit 510 may provide an input power difference value Pd as a power compensation value Pc. Thereafter, the controlling of the converter efficiency may provide the output power compensated by compensating the power compensation value to a reference power (S1545). As an example, the converter efficiency control unit 500 may provide a compensated output power Pdc* by adding the power compensation value Pc to a reference power Pref. In this case, calculation of the pulse width in S1541 may be calculated based on the compensated output power.

Figure 18:
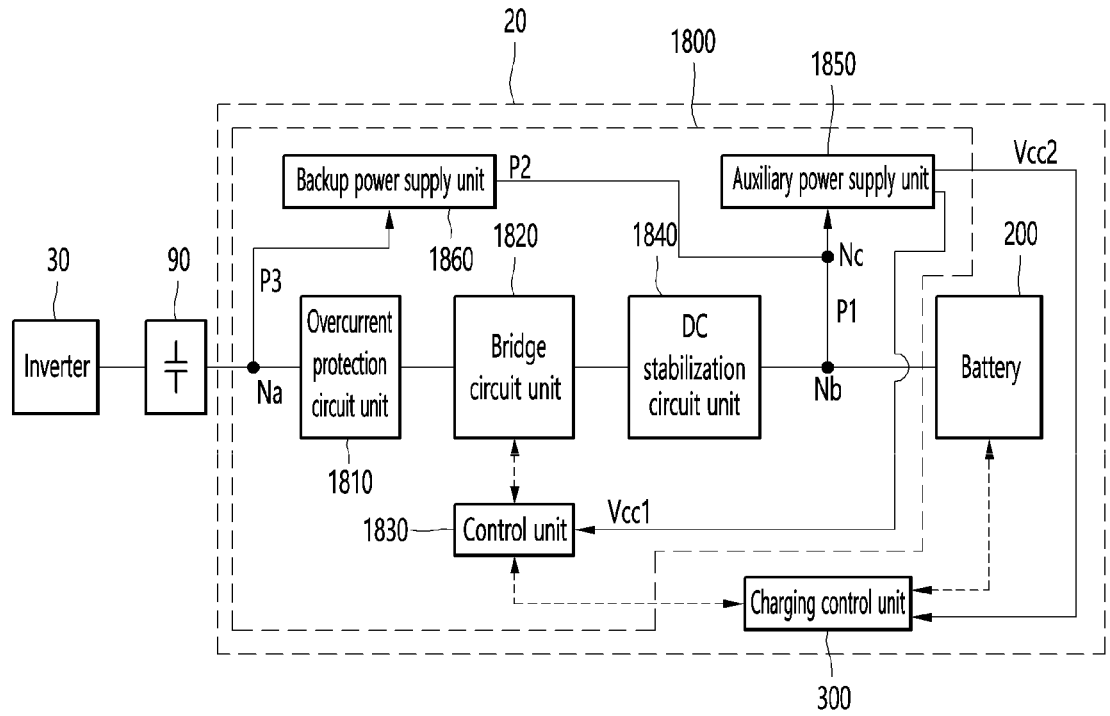
FIG. 18 is a view for describing an energy storage system according to another embodiment.

FIG. 18 is a view for describing an energy storage system according to another embodiment. Referring to FIG. 18, an energy storage system 20 according to another embodiment may include a DC/DC converter 1800, a battery 200, and a charging control unit 300. Although not shown in FIG. 1, the energy storage system 20 may be connected to an inverter 30 via a DC link capacitor 90. That is, the DC link capacitor 90 may be disposed between the energy storage system 20 and the inverter 30. Accordingly, the energy storage system 20 may receive a DC voltage Vdc of the DC link capacitor 90 in a charging mode and provide the DC voltage Vdc to the DC link capacitor 90 in a discharging mode. In addition, a configuration included in a DC/DC converter of an energy storage system according to another embodiment to be described later may be included in a configuration of the DC/DC converter of the energy storage system according to one embodiment of FIGS. 2 to 17. The battery 200 receives charging power from the DC/DC converter 1800 in the charging mode, and may perform a charging operation by the received power. In addition, the battery 200 may output the power stored already to the DC/DC converter 1800 in the discharging mode. Further, the battery 200 may include a plurality of battery cells for performing the charging operation and the discharging operation. In addition, the battery 200 may be connected to a second terminal Nb.

The charging control unit 300 may include a battery management system (BMS). The charging control unit 300 may provide battery state information on a state of the battery 200 to a system control unit 80. For example, the charging control unit 300 may monitor at least one of a voltage, current, temperature, remaining power, and charging state of the battery 200, and may transmit status information of the monitored battery 200 to the system control unit 80. In addition, the charging control unit 300 may allow a plurality of battery cells to maintain an appropriate voltage while charging or discharging. Further, the charging control unit 300 may operate based on a control signal of the system control unit 80. Furthermore, the charging control unit 300 may control the DC/DC converter 1800 according to the status information of the monitored battery 200. In addition, the charging control unit 300 may control the DC/DC converter 1800 according to the charging mode or the discharging mode. More specifically, the charging control unit 300 may provide a charge control signal or a discharge control signal for controlling the DC/DC converter 1800 to a control unit 1830 of the DC/DC converter 1800, and the control unit 1830 of the DC/DC converter 1800 may provide a PWM signal to a switch of the DC/DC converter 1800 based on the charge control signal or the discharge control signal. In addition, the charging control unit 300 may be driven based on a second driving power VCC2 provided from an auxiliary power supply unit 1850.

The DC/DC converter 1800 may convert a magnitude of the DC power supplied by the energy storage system 20 in the charging mode or in the discharging mode. That is, the DC/DC converter 1800 may be a bidirectional DC/DC converter. More specifically, the DC/DC converter 2300 may convert the DC power supplied from a power generation device 10 or the inverter 30 to the DC link capacitor 90 into a voltage magnitude for charging the battery 200 to provide it to the battery 200. In addition, the DC/DC converter 1800 may convert the DC power provided by the battery 200 into a voltage magnitude that the inverter 30 may use to provide it to the DC link capacitor 90.

The DC/DC converter 1800 may include an overcurrent protection circuit unit 1810, a bridge circuit unit 1820, a control unit 1830, a DC stabilization circuit unit 1840, an auxiliary power supply unit 1850, and a backup power supply unit 1860. The control unit 1830 may generate a PWM signal based on a control signal provided from the charging control unit 300 to provide it to the bridge circuit unit 1820 including a switch. The control unit 1830 may be driven based on a first driving power VCC1 provided from the auxiliary power supply unit 1850.

The overcurrent protection circuit unit 1810 may prevent EOS or an overcurrent from flowing into the energy storage system 20 or flowing out to the outside thereof. The overcurrent protection circuit unit 1810 may be disposed between a first terminal Na connected to the DC link capacitor 90 and the bridge circuit unit 1820. In addition, the overcurrent protection circuit unit 1810 may include a circuit breaker. In this case, the overcurrent protection circuit unit 1810 may open between the first terminal Na and the bridge circuit unit 1820 when EOS or an overcurrent flows into the energy storage system 20. Accordingly, the overcurrent protection circuit unit 1810 may block input/output of current to/from the energy storage system 20 and the outside thereof.

The bridge circuit unit 1820 may be disposed between the overcurrent protection circuit unit 1810 and the DC stabilization circuit unit 1840 to be electrically connected to each configuration. The bridge circuit unit 1820 may step down the DC voltage of the DC power input from the overcurrent protection circuit unit 1810 in a step down mode to output it to the DC stabilization circuit unit 1840. Further, the bridge circuit unit 1820 may step up the DC voltage of the DC power input from the DC stabilization circuit unit 1840 in a step up mode to output it to the overcurrent protection circuit unit 1810. The bridge circuit unit 1820 may include one or more switches. As an example, the bridge circuit unit 1820 may be an isolation type full bridge circuit of FIG. 4. As another example, the bridge circuit unit 1820 may be a non-isolation type full bridge circuit of FIG. 7. The embodiment is not limited thereto, and the bridge circuit unit 1820 may be configured as a half bridge circuit. The bridge circuit unit 1820 may operate based on the PWM signal of the control unit 1830.

The DC stabilization circuit unit 1840 may operate such that the DC voltage is stepped up in the step up mode of the bridge circuit unit 1820 and the DC voltage is stepped down in the step down mode. In addition, the DC stabilization circuit unit 1840 may be an LC filter. The DC stabilization circuit unit 1840 may be connected to the second terminal Nb.

The auxiliary power supply unit 1850 may generate driving power based on a first power P1 provided in the second terminal Nb. The first power P1 provided in the second terminal Nb is based on energy stored in the battery 200. The first power P1 may be standby power. In addition, the auxiliary power supply unit 1850 may receive a second power P2 from the backup power supply unit 1860 when the first power P1 is not supplied from the second terminal Nb, and may generate driving power based on the second power P2. As an example, when the first power P1 is not supplied from the second terminal Nb to the auxiliary power supply unit 1850, the battery 200 connected to the second terminal Nb may be over-discharged. The second power P2 may be the minimum power for generating the driving power. The driving power may be in plural. The driving power may include the first driving power VCC1 provided to the charging control unit 300 of the energy storage system 20 and the second driving power VCC2 provided to the control unit 1830 of the DC/DC converter 1800. The embodiment is not limited thereto, and the auxiliary power supply unit 1860 may output a plurality of driving powers having different voltage levels as needed. More specifically, a third terminal Nc disposed at an input terminal of the auxiliary power supply unit 1850 may be connected to the second terminal Nb and an output unit of the backup power supply unit 1860. When the first power P1 is provided to the second terminal Nb, the first power P1 may be input to the third terminal Nc to be input to the input terminal of the auxiliary power supply unit 1850. In addition, when the first power P1 is not provided to the second terminal Nb and the second power P2 is provided to the second terminal Nb, the second power P1 may be input to the third terminal Nc to be input to the input terminal of the auxiliary power supply unit 1850. Therefore, even when the battery is over-discharged, the DC/DC converter may generate the driving power, thereby performing the charging operation of the battery. In addition, in the DC/DC converter, it is possible to charge without battery replacement even when the battery is over-discharged.

The backup power supply unit 1860 may provide the second power P2 based on power provided from the DC link capacitor 90 or the inverter 30. More specifically, the backup power supply unit 1860 may be electrically connected between the first terminal Na and the auxiliary power supply unit 1850. The backup power supply unit 1860 may generate the second power P2 based on a third power P3 provided from the first terminal Na. In addition, the backup power supply unit 1860 may provide the second power P2 to the auxiliary power supply unit 1850 when the first power P1 is not provided from the second terminal Nb to the auxiliary power supply unit 1850. As an example, the backup power supply unit 1860 may have one end connected to the first terminal Na and the other end connected to the third terminal Nc. The backup power supply unit 1860 may provide the second power P2 to the third terminal Nc, and the second power P2 may be provided from the third terminal Nc to the auxiliary power supply unit 1850.

Therefore, in another embodiment, it is possible to charge the battery even when the battery is over-discharged. Further, in another embodiment, the battery does not need to be replaced even when the battery is over-discharged.

Figure 19:
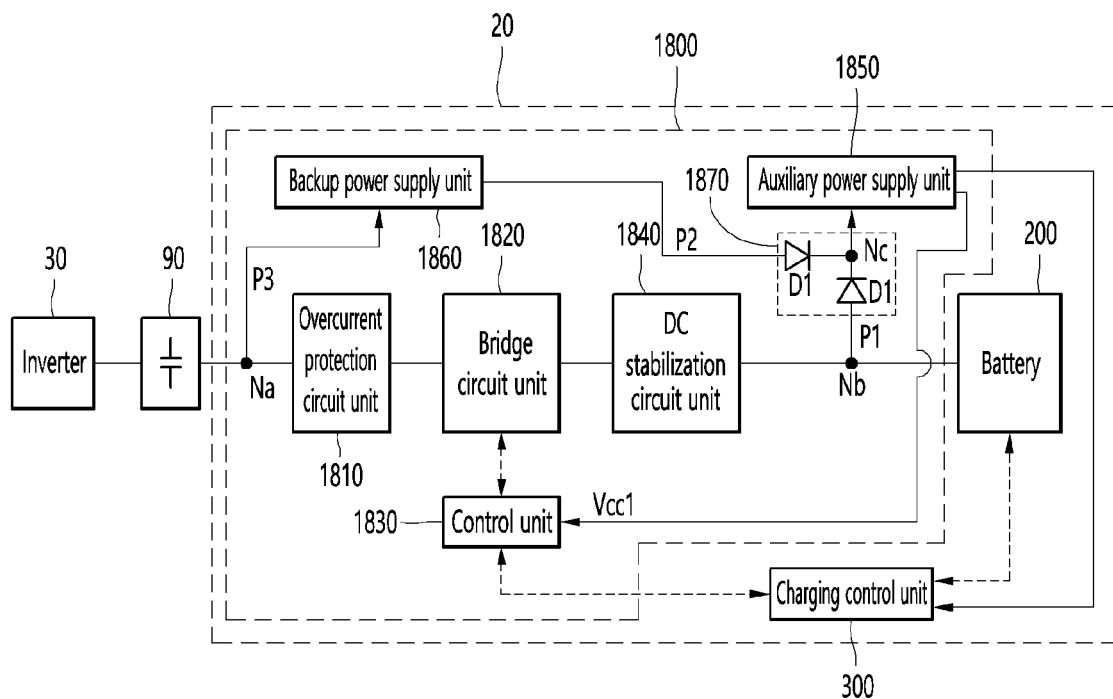
FIG. 19 is a view for describing an energy storage system according to still another embodiment.

FIG. 19 is a view for describing an energy storage system according to still another embodiment. Referring to FIG. 19, the energy storage system according to still another embodiment of FIG. 19 has the same remaining configuration except for a current limiter 1870 in the energy storage system of FIG. 18. Therefore, the same description as the energy storage system of FIG. 18 is omitted.

An energy storage system 20 according to still another embodiment may include a DC/DC converter 1800 including the current limiter 1870. The current limiter 1870 may be disposed at an input unit of the auxiliary power supply unit 1850. As an example, the current limiter 1870 may be disposed in the third terminal Nc. The current limiter 1870 may prevent power input to the auxiliary power supply unit 1850 from being provided in a reverse direction. In addition, the current limiter 8170 may prevent from being provided to a configuration to which the provided power should not be provided. More specifically, the current limiter 1870 may include a first diode D1 and a second diode D2. The first diode D1 allows the first power P1 provided from the second terminal Nb to be provided to the third terminal Nc. In addition, the first diode D1 may prevent the second power P2 from being provided to the second terminal Nb. The second diode D2 allows the second power P2 provided by the backup power supply unit 1860 to be provided to the third terminal Nc. In addition, the second diode D2 may prevent the first power P1 from being provided to the backup power supply unit 1860.

Therefore, in the DC/DC converter according to another embodiment, the auxiliary power supply unit may generate stably the driving power by using the current limiter, and it is possible to prevent unnecessary charging of the battery.

Figure 20:
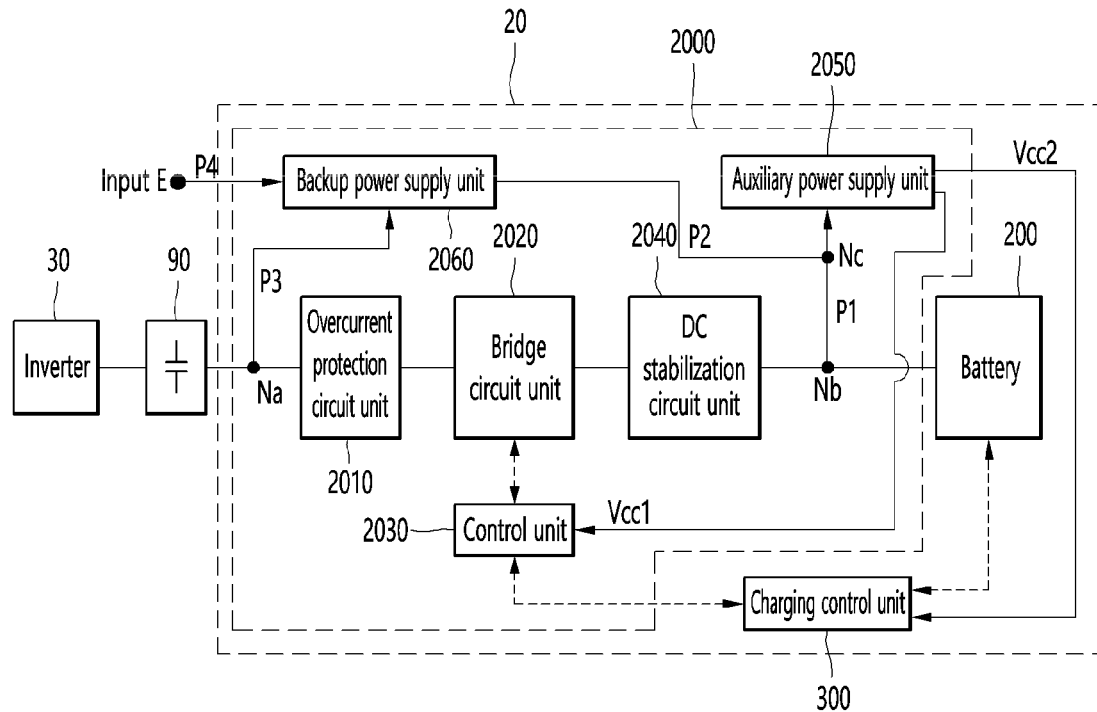
FIG. 20 is a view for describing an energy storage system according to still another embodiment.

FIG. 20 is a view for describing an energy storage system according to still another embodiment. Referring to FIG. 20, the energy storage system according to still another embodiment of FIG. 20 has the same remaining configuration except for a DC/DC converter in the energy storage system of FIG. 18. Therefore, the same description as the energy storage system of FIG. 18 is omitted.

A DC/DC converter 2000 may include an overcurrent protection circuit unit 2010, a bridge circuit unit 2020, a control unit 2030, a DC stabilization circuit unit 2040, an auxiliary power supply unit 2050, and a backup power supply unit 2060. Although not shown in the drawing, the DC/DC converter 2000 may further include the current limiter of FIG. 19.

The control unit 2030 may generate a PWM signal based on a control signal provided from the charging control unit 300 to provide it to the bridge circuit unit 2020 including a switch. The control unit 2030 may be driven based on a first driving power VCC1 provided from the auxiliary power supply unit 2050.

The overcurrent protection circuit unit 2010 may prevent EOS or an overcurrent from flowing into the energy storage system 20 or flowing out to the outside thereof. The overcurrent protection circuit unit 2010 may be disposed between a first terminal Na connected to the DC link capacitor 90 and the bridge circuit unit 2020. In addition, the overcurrent protection circuit unit 2010 may include a circuit breaker. In this case, the overcurrent protection circuit unit 2010 may open between the first terminal Na and the bridge circuit unit 2020 when EOS or an overcurrent flows into the energy storage system 20. Accordingly, the overcurrent protection circuit unit 2010 may block input/output of current to/from the energy storage system 20 and the outside thereof.

The bridge circuit unit 2020 may be disposed between the overcurrent protection circuit unit 2010 and the DC stabilization circuit unit 2040 to be electrically connected to each configuration. The bridge circuit unit 2020 may step down the DC voltage of the DC power input from the overcurrent protection circuit unit 2010 in a step down mode to output it to the DC stabilization circuit unit 2040. Further, the bridge circuit unit 2020 may step up the DC voltage of the DC power input from the DC stabilization circuit unit 2040 in a step up mode to output it to the overcurrent protection circuit unit 2010. The bridge circuit unit 2020 may include one or more switches. As an example, the bridge circuit unit 2020 may be an isolation type full bridge circuit of FIG. 4. As another example, the bridge circuit unit 2020 may be a non-isolation type full bridge circuit of FIG. 7. The embodiment is not limited thereto, and the bridge circuit unit 2020 may be configured as a half bridge circuit. The bridge circuit unit 2020 may operate based on the PWM signal of the control unit 2030.

The DC stabilization circuit unit 2040 may operate such that the DC voltage is stepped up in the step up mode of the bridge circuit unit 2020 and the DC voltage is stepped down in the step down mode. In addition, the DC stabilization circuit unit 2040 may be an LC filter. The DC stabilization circuit unit 2040 may be connected to a second terminal Nb.

The auxiliary power supply unit 2050 may generate driving power based on a first power P1 provided in the second terminal Nb. The first power P1 provided in the second terminal Nb is based on energy stored in the battery 200. The first power P1 may be standby power. In addition, the auxiliary power supply unit 2050 may receive a second power P2 from the backup power supply unit 2060 when the first power P1 is not supplied from the second terminal Nb, and may generate driving power based on the second power P2. As an example, when the first power P1 is not supplied from the second terminal Nb to the auxiliary power supply unit 2050, the battery 200 connected to the second terminal Nb may be over-discharged. The second power P2 may be the minimum power for generating the driving power. The driving power may be in plural. The driving power may include the first driving power VCC1 provided to the charging control unit 300 of the energy storage system 20 and the second driving power VCC2 provided to the control unit 2030 of the DC/DC converter 2000. The embodiment is not limited thereto, and the auxiliary power supply unit 2060 may output a plurality of driving powers having different voltage levels as needed. More specifically, a third terminal Nc disposed at an input terminal of the auxiliary power supply unit 2050 may be connected to the second terminal Nb and an output unit of the backup power supply unit 2060. When the first power P1 is provided to the second terminal Nb, the first power P1 may be input to the third terminal Nc to input to the input terminal of the auxiliary power supply unit 2050. In addition, when the first power P1 is not provided to the second terminal Nb and the second power P2 is provided to the second terminal Nb, the second power P1 may be input to the third terminal Nc to be input to the input terminal of the auxiliary power supply unit 2050. Therefore, even when the battery is over-discharged, the DC/DC converter may generate the driving power, thereby performing the charging operation of the battery. In addition, in the DC/DC converter, it is possible to charge without battery replacement even when the battery is over-discharged.

The backup power supply 2060 may provide the second power P2 based on power provided from an external power supply disposed the outside of the DC/DC converter 2000. More specifically, the backup power supply unit 1860 may be electrically connected between an external input terminal InputE and the auxiliary power supply unit 2050. The backup power supply unit 2060 may generate the second power P2 based on a fourth power P4 provided from the external input terminal InputE. In addition, the backup power supply unit 2060 may provide the second power P2 to the auxiliary power supply unit 2050 when the first power P1 is not provided from the second terminal Nb to the auxiliary power supply unit 1850. As an example, the backup power supply 2060 may have one end connected to the external input terminal InputE and the other end connected to the third end Nc. The backup power supply unit 2060 may provide the second power P2 to the third terminal Nc, and the second power P2 may be provided from the third terminal Nc to the auxiliary power supply unit 2050.

Therefore, in still another embodiment, it is possible to charge the battery even when the battery is over-discharged. Further, in still another embodiment, the battery does not need to be replaced even when the battery is over-discharged.

Figure 21:
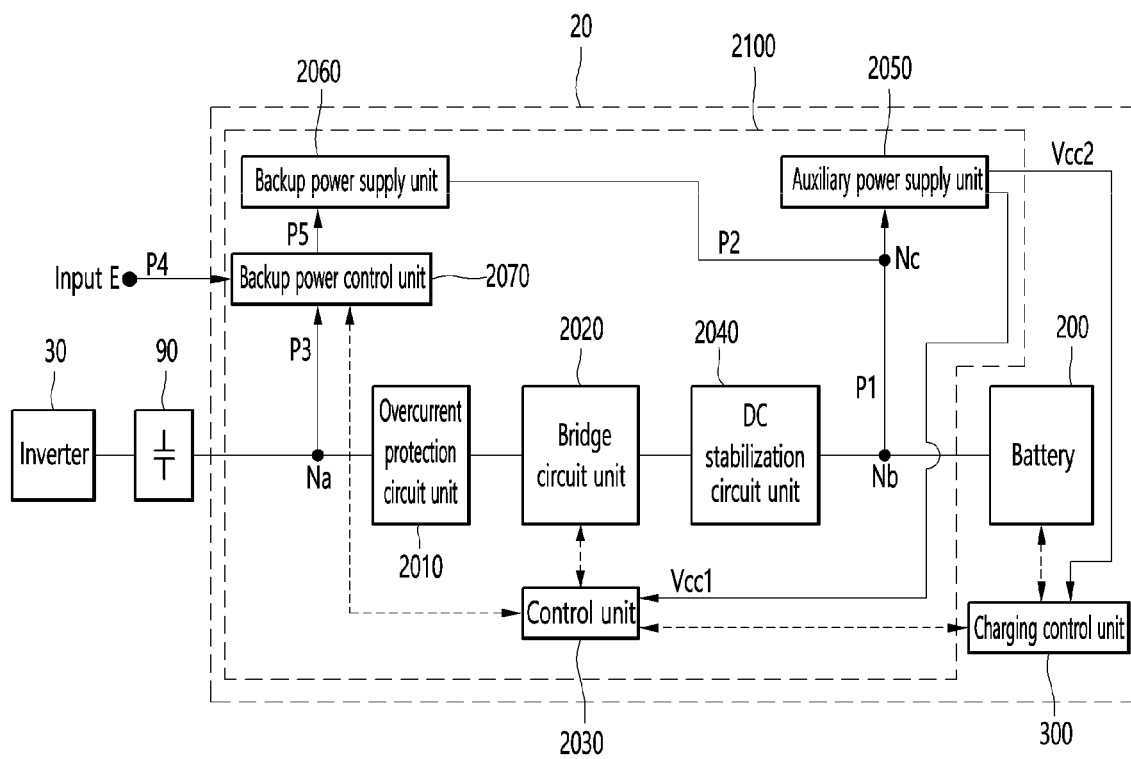
FIG. 21 is a view for describing an energy storage system according to still another embodiment.

FIG. 21 is a view for describing an energy storage system according to still another embodiment. Referring to FIG. 21, the energy storage system according to still another embodiment of FIG. 21 has the same remaining configuration except for a backup power supply unit and a backup power control unit in the energy storage systems of FIGS. 18 and 20. Therefore, the same description as the energy storage systems of FIGS. 18 and 20 is omitted.

A backup power supply unit 2060 may provide a second power P2 based on power provided from a backup power control unit 2070. More specifically, the backup power supply unit 1860 may be electrically connected between the backup power control unit 2070 and an auxiliary power supply unit 2050. The backup power supply unit 2060 may generate the second power P2 based on a fifth power P5 provided from the backup power control unit 2070. In addition, the backup power supply unit 2060 may provide the second power P2 to the auxiliary power supply unit 2050 when the first power P1 is not supplied from the second terminal Nb to the auxiliary power supply unit 1850. As an example, the backup power supply unit 2060 may have one end connected to the backup power control unit 2070 and the other end connected to the third terminal Nc. The backup power supply unit 2060 may provide the second power P2 to the third terminal Nc, and the second power P2 may be provided from the third terminal Nc to the auxiliary power supply unit 2050.

The DC/DC converter of the energy storage system according to still another embodiment may include a backup power control unit 2070. The backup power control unit 2070 may select any one of power provided from an external power supply and power provided from the first terminal Na based on a control signal of the control unit 2030 to provide it to the backup power supply unit 2060. More specifically, the backup power control unit 2070 may be disposed between an external input terminal InputE, the first terminal Na, and the backup power supply unit 2060. The backup power control unit 2070 may include a switch. As an example, the control unit 2030 may set the third power P3 of the first terminal Na as the fifth power P5 by controlling the backup power control unit 2070 to provide it to the backup power supply unit 2060. In addition, the control unit 2030 may set the fourth power P4 of the external input terminal InputE as the fifth power P5 by controlling the backup power control unit 2070 to provide it to the backup power supply unit 2060. Therefore, in still another embodiment, it is possible to charge the battery even when the battery is over-discharged. Further, in still another embodiment, the battery does not need to be replaced even when the battery is over-discharged.

Figure 22:
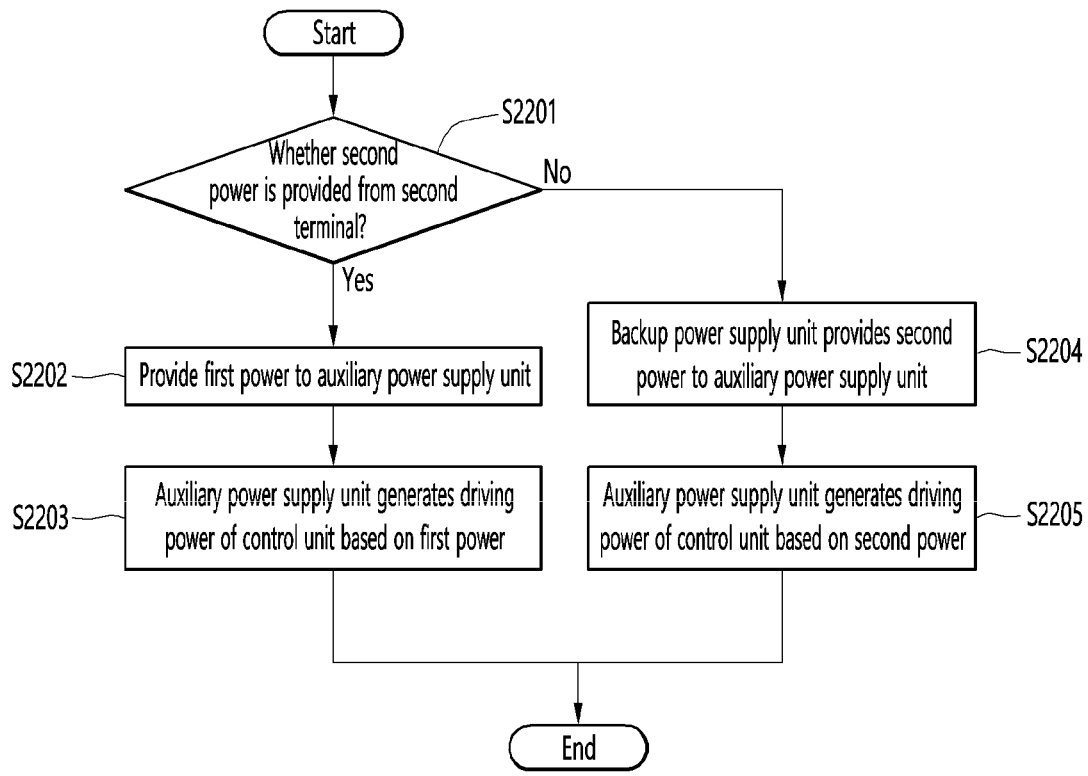
FIG. 22 is a view for describing a power conversion method for charging a battery in a DC/DC converter of an energy storage system according to an embodiment.

FIG. 22 is a view for describing a power conversion method for charging a battery in a DC/DC converter of an energy storage system according to an embodiment. The power conversion method of FIG. 22 may use a configuration of the DC/DC converter of FIGS. 18 to 21.

Referring to FIG. 22, the power conversion method of the DC/DC converter according to the embodiment may include determining whether a first power is provided from a second terminal (S2201). As an example, in a battery discharging state, an auxiliary power supply unit may determine whether the first power is provided in a first terminal.

The power conversion method of the DC/DC converter according to the embodiment may include providing the first power to the auxiliary power supply unit (S2202) when the first power is provided from the second terminal (Yes in S2201). That is, when the first power is provided from the first terminal, the auxiliary power supply unit may receive the first power.

The power conversion method of the DC/DC converter according to the embodiment may include a step in which the auxiliary power supply unit generates driving power of a control unit based on the first power when the first power is supplied (S2203). More specifically, the auxiliary power supply unit may generate a plurality of driving powers based on the first power. The auxiliary power supply may provide the generated driving power to a required configuration. As an example, as shown in FIGS. 18 to 21, the auxiliary power supply unit may generate a first driving power for driving a charging control unit and a second driving power for driving the control unit of the DC/DC converter.

The power conversion method of the DC/DC converter according to the embodiment may include a step in which a backup power supply unit provides a second power to the auxiliary power supply unit (S2204) when the first power is not provided from the second terminal (No in S2201). A method in which the backup power supply unit provides the second power to the auxiliary power supply unit may be the same as a configuration in which the backup power supply unit of FIGS. 18 to 21 provides the second power supply to the auxiliary power supply unit.

The power conversion method of the DC/DC converter according to the embodiment may include a step in which the auxiliary power supply unit generates the driving power of the control unit based on the second power (S2205). More specifically, the auxiliary power supply unit may generate a plurality of driving powers based on the second power. The auxiliary power supply may provide the generated driving power to a required configuration. As an example, as shown in FIGS. 18 to 21, the auxiliary power supply unit may generate the first driving power for driving the charging control unit and the second driving power for driving the control unit of the DC/DC converter.

Therefore, in still another embodiment, it is possible to charge the battery even when the battery is over-discharged. Further, in still another embodiment, the battery does not need to be replaced even when the battery is over-discharged.

Figure 23:
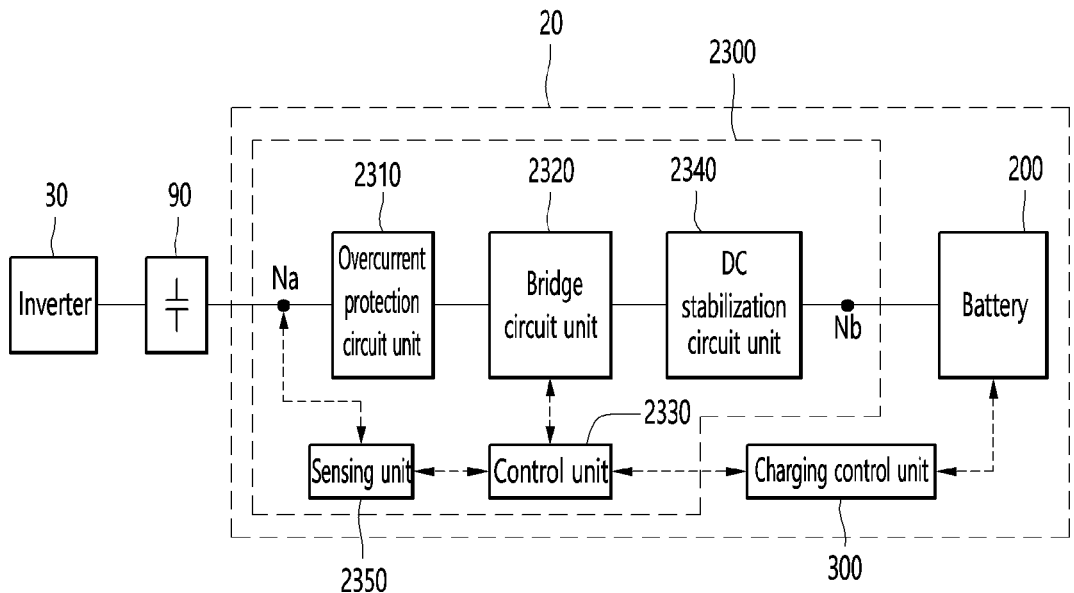
FIG. 23 is a view for describing an energy storage system according to still another embodiment.

FIG. 23 is a view for describing an energy storage system according to still another embodiment. Referring to FIG. 23, an energy storage system 20 according to still another embodiment may include a DC/DC converter 2300, a battery 200, and a charging control unit 300. Although not shown in FIG. 1, the energy storage system 20 may be connected to an inverter 30 via a DC link capacitor 90. That is, the DC link capacitor 90 may be disposed between the energy storage system 20 and the inverter 30. Accordingly, the energy storage system 20 may receive a DC voltage Vdc of the DC link capacitor 90 in a charging mode and provide the DC voltage Vdc to the DC link capacitor 90 in a discharging mode. In addition, a configuration included in a DC/DC converter of an energy storage system according to another embodiment to be described later may be included in a configuration of the DC/DC converter of the energy storage system according to one embodiment of FIGS. 2 to 22. The battery 200 receives charging power from the DC/DC converter 2300 in the charging mode, and may perform a charging operation by the received power. In addition, the battery 200 may output the power stored already to the DC/DC converter 2300 in the discharging mode. Further, the battery 200 may include a plurality of battery cells for performing the charging operation and the discharging operation. In addition, the battery 200 may be connected to a second terminal Nb.

The charging control unit 300 may include a battery management system (BMS). The charging control unit 300 may provide battery state information on a state of the battery 200 to a system control unit 80. For example, the charging control unit 300 may monitor at least one of a voltage, current, temperature, remaining power, and charging state of the battery 200, and may transmit status information of the monitored battery 200 to the system control unit 80. In addition, the charging control unit 300 may allow a plurality of battery cells to maintain an appropriate voltage while charging or discharging. Further, the charging control unit 300 may operate based on a control signal of the system control unit 80. Furthermore, the charging control unit 300 may control the DC/DC converter 2300 according to the status information of the monitored battery 200. In addition, the charging control unit 300 may control the DC/DC converter 2300 according to the charging mode or the discharging mode. More specifically, the charging control unit 300 may provide a charge control signal or a discharge control signal for controlling the DC/DC converter 2300 to a control unit 1830 of the DC/DC converter 2300, and the control unit 2330 of the DC/DC converter 2300 may provide a PWM signal to a switch of the DC/DC converter 2300 based on the charge control signal or the discharge control signal.

The DC/DC converter 2300 may convert a magnitude of the DC power supplied by the energy storage system 20 in the charging mode or in the discharging mode. That is, the DC/DC converter 2300 may be a bidirectional DC/DC converter. More specifically, the DC/DC converter 2300 may convert the DC power supplied from a power generation device 10 or the inverter 30 to the DC link capacitor 90 into a voltage magnitude for charging the battery 200 to provide it to the battery 200. In addition, the DC/DC converter 2300 may convert the DC power provided by the battery 200 into a voltage magnitude that the inverter 30 may use to provide it to the DC link capacitor 90. In addition, the DC/DC converter 2300 may operate in the charging mode, the standby mode, and the discharging mode based on a voltage provided by a DC voltage link capacitor. That is, the DC/DC converter 2300 may determine whether to operate in the charging mode, the standby mode, and the discharging mode and may operate by monitoring the voltage provided from the DC voltage link capacitor without provision of a control signal of the charging control unit 300. A more detailed description of an operation of the DC/DC converter 2300 in the charging mode, the standby mode, and the discharging mode will be described later.

The DC/DC converter 2300 may include an overcurrent protection circuit unit 2310, a bridge circuit unit 2320, a control unit 2330, a DC stabilization circuit unit 2340, an auxiliary power supply unit 2350, and a backup power supply unit 2360. The control unit 2330 may control the bridge circuit unit 2320. As an example, the control unit 2330 may generate a PWM signal based on a control signal provided from the charging control unit 300 to provide it to the bridge circuit unit 2320 including a switch. As another example, the control unit 2330 may determine an operation mode and a reference power according to the magnitude of the voltage provided in the DC link capacitor 90. Further, the control unit 2330 may generate the PWM signal based on the determined reference power to provide it to the bridge circuit unit 2320 including the switch. A specific description of another example will be described later.

The overcurrent protection circuit unit 2310 may prevent EOS or an overcurrent from flowing into the energy storage system 20 or flowing out to the outside thereof. The overcurrent protection circuit unit 2310 may be disposed between a first terminal Na connected to the DC link capacitor 90 and the bridge circuit unit 2320. In addition, the overcurrent protection circuit unit 2310 may include a circuit breaker. In this case, the overcurrent protection circuit unit 2310 may open between the first terminal Na and the bridge circuit unit 2320 when EOS or an overcurrent flows into the energy storage system 20. Accordingly, the overcurrent protection circuit unit 2310 may block the input/output of the current to/from the energy storage system 20 and the outside thereof.

The bridge circuit unit 2320 may be disposed between the overcurrent protection circuit unit 2310 and the DC stabilization circuit unit 2340 to be electrically connected to each configuration. The bridge circuit unit 2320 may step down the DC voltage of the DC power input from the overcurrent protection circuit unit 2310 in a step down mode to output it to the DC stabilization circuit unit 2340. Further, the bridge circuit unit 2320 may step up the DC voltage of the DC power input from the DC stabilization circuit unit 2340 in a step up mode to output it to the overcurrent protection circuit unit 2310. The bridge circuit unit 2320 may include one or more switches. As an example, the bridge circuit unit 2320 may be an isolation type full bridge circuit of FIG. 4. As another example, the bridge circuit unit 2320 may be a non-isolation type full bridge circuit of FIG. 7. The embodiment is not limited thereto, and the bridge circuit unit 2320 may be configured as a half bridge circuit. The bridge circuit unit 2320 may operate based on the PWM signal of the control unit 2330.

The DC stabilization circuit unit 2340 may operate such that the DC voltage is stepped up in the step up mode of the bridge circuit unit 2320 and the DC voltage is stepped down in the step down mode. In addition, the DC stabilization circuit unit 2340 may be an LC filter. The DC stabilization circuit unit 2340 may be connected to a second terminal Nb.

A sensing unit 2350 may sense a voltage of the first terminal Na to provide it to the control unit 2330. The voltage of the first terminal Na may be a DC voltage provided by the DC link capacitor 90. In addition, the sensing unit 2350 may be controlled by the control unit 2330.

Therefore, in still another embodiment, it is possible to quickly determine an operation mode of charging or discharging of a battery. Further, in still another embodiment, a separate communication line and a communication unit are not required for droop control when charging or discharging the battery. Furthermore, in still another embodiment, quick droop control is possible when charging or discharging the battery.

Figure 24:
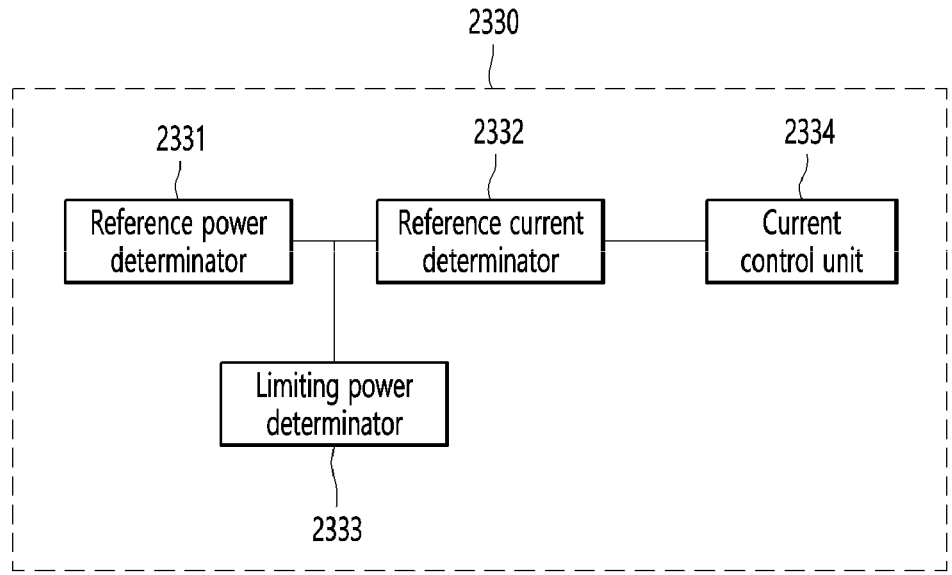
FIG. 24 is a view for describing a control unit of FIG. 23.
Figure 25:
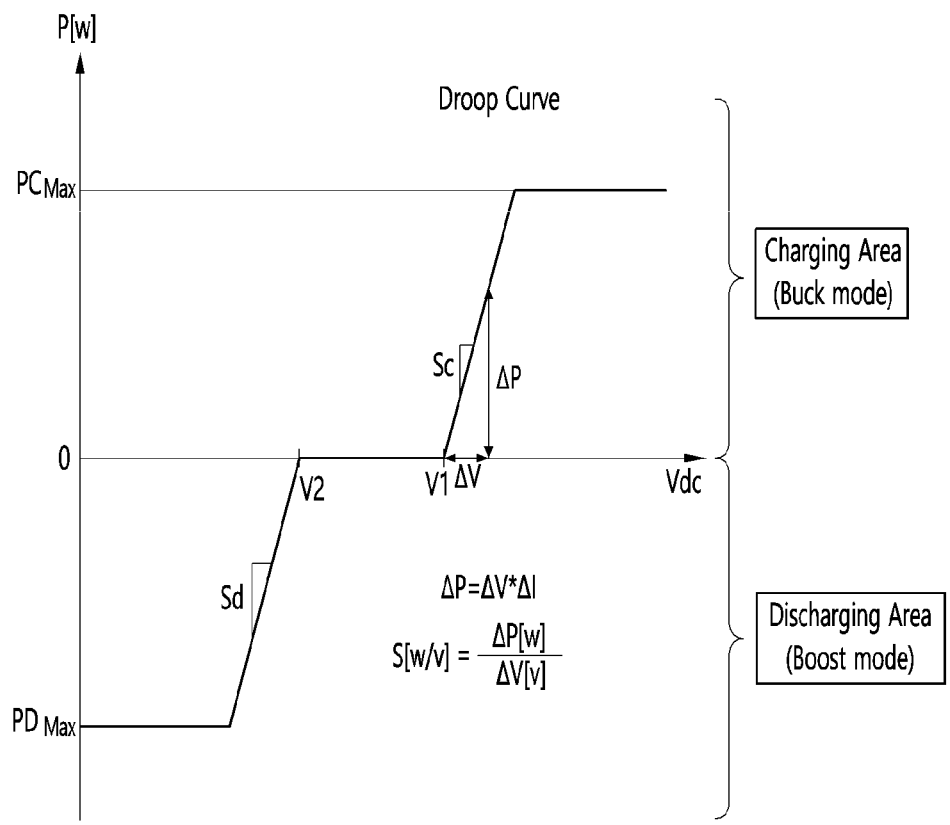
FIG. 25 is a view for describing a droop control curve of the energy storage system of FIG. 23.
Figure 26:
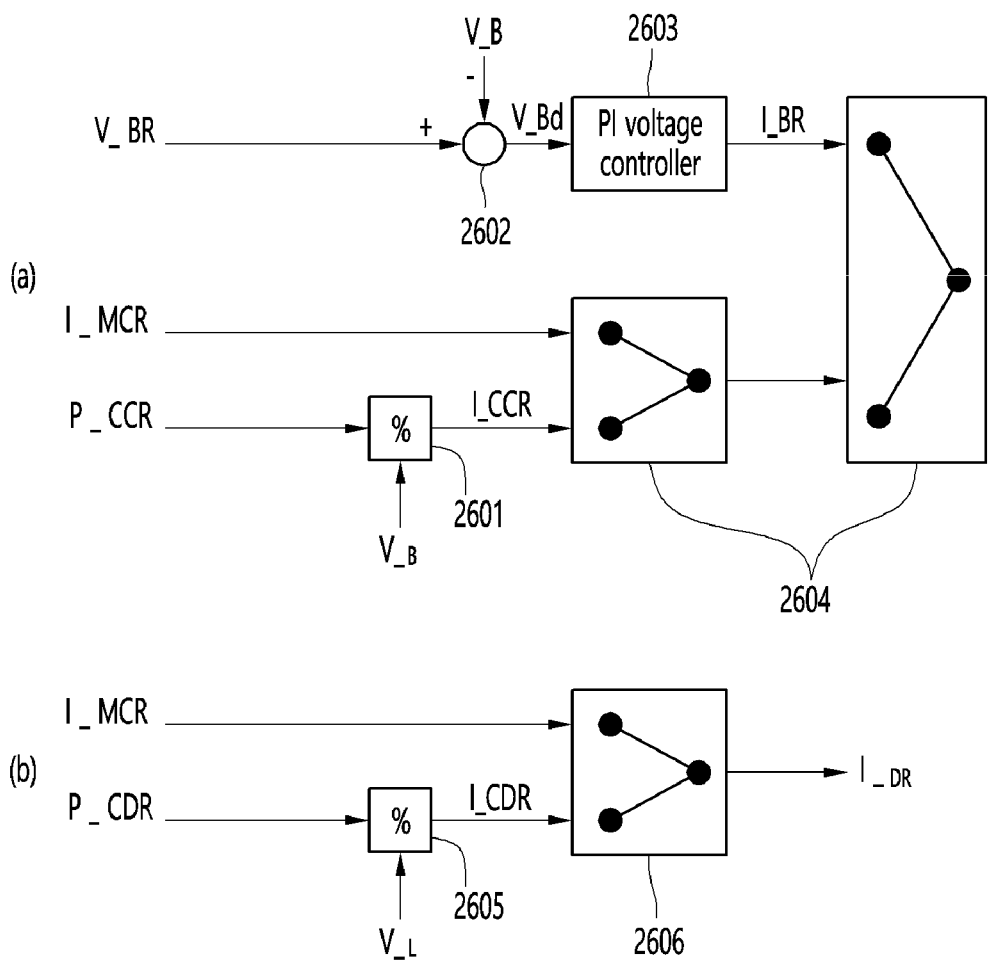
FIG. 26 is a view for describing a reference current determinator of FIG. 24.
Figure 27:
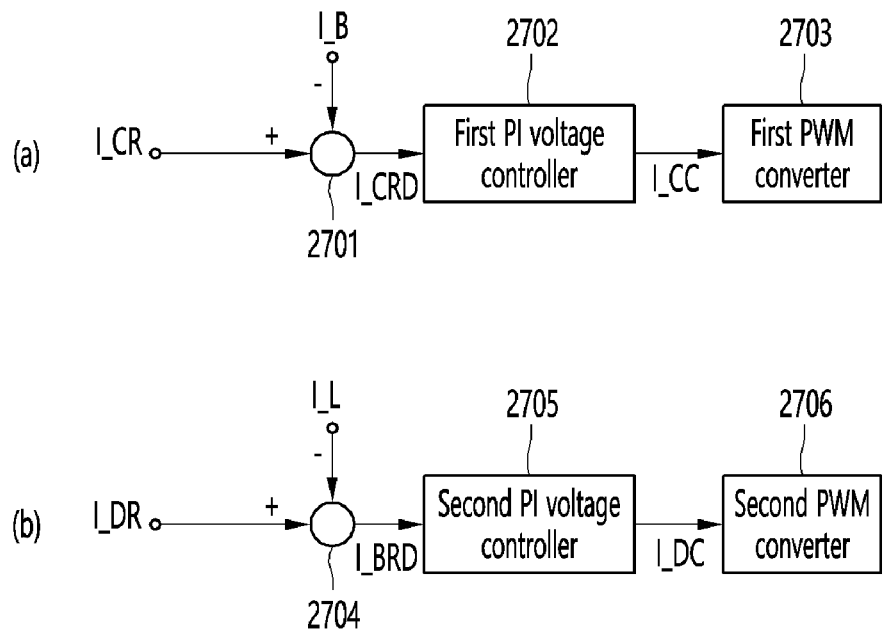
FIG. 27 is a view for describing a current control unit of FIG. 24.

FIG. 24 is a view for describing the control unit of FIG. 23, FIG. 25 is a view for describing a droop control curve of the energy storage system of FIG. 23, FIG. 26 is a view for describing a reference current determinator of FIG. 24, and FIG. 27 is a view for describing a current control unit of FIG. 24.

Referring to FIG. 24, a control unit 2330 of a DC/DC converter 2300 according to still another embodiment may include a reference power determinator 2331. The reference power determinator 2331 may determine an operation mode and a reference power.

As an example, the reference power determinator 2331 may determine the operation mode and the reference power according to the magnitude of a voltage of a first terminal. More specifically, referring to FIG. 25, the reference power determinator 2331 may determine the operation mode and the reference power based on a droop control curve according to the voltage of the first terminal. In case of the operation mode, the reference power determinator 2331 may determine as a charging mode when a voltage Vdc of the first terminal is greater than or equal to a first voltage V1. The reference power determinator 2331 may determine as a standby mode when the voltage Vdc of the first terminal is smaller than the first voltage V1 and is greater than a second voltage V2. The reference power determinator 2331 may determine as a discharging mode when the voltage Vdc of the first terminal is less than or equal to the second voltage V2.

The first voltage V1 and the second voltage V2 may be preset voltages, but the embodiment is not limited thereto, and the first voltage V1 and the second voltage V2 may be set directly by using an external communication or by a user. The first voltage V1 may be greater than the second voltage V2.

In case of the reference power, when the operation mode is in the charging mode, the reference power determinator 2331 may calculate the reference power by multiplying a charging power slope Sc after subtracting the first voltage V1 from the voltage Vdc of the first terminal. When the operation mode is in the discharging mode, the reference power determinator 2331 may calculate the reference power by multiplying a discharging power slope Sd after subtracting the voltage Vdc of the first terminal from the second voltage V2. The charging power slope Sc and the discharging power slope Sd may be preset values, but the embodiment is not limited thereto, and may be set directly by using an external communication or by a user.

The charging power slope Sc and the discharging power slope Sd may be different from each other, but the embodiment is not limited thereto, and may be equal to each other. In addition, the droop control curve may include maximum power to limit the reference power to the maximum power. Specifically, the maximum power may include a maximum charging power PCMax and a maximum discharging power PDMax. The maximum charging power PCMax may be a power value at which the reference power may be maximized when the operation mode is in the charging mode. The maximum discharging power PDMax may be a power value at which the reference power may be maximized when the operation mode is in the discharging mode.

As another example, the reference power determinator 2331 may determine the operation mode according to a state of a battery voltage. More specifically, the reference power determinator 2331 may operate in the charging mode when the battery voltage is greater than or equal to a predetermined voltage.

As still another example, the reference power determinator 2331 may determine the operation mode and the reference power according to a user's control. In this case, the user may determine the operation mode and the reference power directly or using communication. In addition, the reference power determinator 2331 may determine the operation mode and the reference power by selecting any one of one example, another example, and still another example.

The control unit 2330 of the DC/DC converter 2300 according to still another embodiment may include a reference current determinator 2332. The reference current determinator 2332 may determine a reference current based on the operation mode and the reference power determined by the reference power determinator 2331. More specifically, referring to FIG. 26, in case of a charging mode a, the reference current determinator 2332 may include a first reference current selector 2604. The first reference current selector 2604 may select any one of a reference current I_CCR determined using the droop curve according to the magnitude of the voltage of the first terminal determined in the reference power determinator 2331, a reference current I_MCR determined according to setting of the user, and a reference current I_BR determined according to the state of the battery voltage as a reference current I_CR for generating a PWM signal which is a switching signal.

In addition, in the case of the charging mode a, the reference current determinator 2332 may include a first current extractor 2601. The first current extractor 2601 may divide a reference power P_CCR determined using the droop curve according to the magnitude of the voltage of the first terminal determined in the reference power determinator 2331 by a battery voltage V_B to extract the reference current I_CCR. Further, in the case of the charging mode a, the reference current determinator 2332 may include a first comparator 2602 and a PI voltage controller 2603. The first comparator 2602 may compare the current battery voltage V_B with a preset battery reference voltage V_BR to provide a battery voltage difference value V_Bd to the PI voltage controller 2603. The PI voltage controller 2603 may provide the reference current I_BR according to a PI control based on the battery voltage difference value V_Bd. In case of a discharging mode b, the reference current determinator 2332 may include a second reference current selector 2604.

The second reference current selector 2604 may select any one of a reference current I_CDR determined using the droop curve according to the magnitude of the voltage of the first terminal determined in the reference power determinator 2331 and a reference current I_MDR determined according to setting of the user as a reference current I_DR for generating the PWM signal which is the switching signal. In the case of the discharging mode b, the reference current determinator 2332 may include a second current extractor 2605. The second current extractor 2605 may divide a reference power P_CDR determined using the droop curve according to the magnitude of the voltage of the first terminal determined in the reference power determinator 2331 by a voltage V_L of the first terminal, to extract the reference current I_CDR.

The control unit 2330 of the DC/DC converter 2300 according to still another embodiment may include a limiting power determinator 2333. The limiting power determinator 2333 may limit the reference power such that the reference power does not exceed a predetermined power. More specifically, the limiting power determinator 2333 may allow the maximum power to be provided to a current control unit 2334 as the reference power when the determined reference power is greater than the set maximum power. In addition, when the determined reference power is greater than an inverter limitation power according to the inverter 30, the limiting power determinator 2333 may allow the inverter limitation power to be provided to the current control unit 2334 as the reference power. In addition, when the determined reference power is greater than a battery limitation power according to a battery 200, the limiting power determinator 2333 may allow the battery limitation power to be provided to the current control unit 2334 as the reference power.

The control unit 2330 of the DC/DC converter 2300 according to still another embodiment may include the current control unit 2334. The current control unit 2334 may generate the PWM signal which is the switching signal based on the determined reference current. More specifically, referring to FIG. 27, in the case of the charging mode a, the current control unit 2334 may include a second comparator 2701, a first PI current controller 2702, and a first PWM converter 2703. The second comparator 2701 may compare the reference current I_CR with a battery current I_B input to the battery 200 to provide a reference current difference value I_CRD to the first PI current controller 2702. The first PI current controller 2702 may provide a charging control current I_CC according to the PI control to the first PWM converter 2703 based on the reference current difference value I_CRD. The first PWM converter 2703 may provide the PWM signal which is the switching signal to the bridge circuit unit 2320 based on the charging control current I_CC. In the case of the discharging mode b, the current control unit 2334 may include a third comparator 2704, a second PI current controller 2705, and a second PWM converter 2706. The third comparator 2704 may compare the reference current I_DR with a current I_L of the first terminal Na input to the battery 200 to provide a reference current difference value I_DRD to the second PI current controller 2705. The second PI current controller 2705 may provide a discharging control current I_DC according to the PI control to the second PWM converter 2706 based on the reference current difference value I_DRD. The second PWM converter 2706 may provide the PWM signal which is the switching signal to the bridge circuit unit 2320 based on the discharging control current I_DC.

Figure 28:
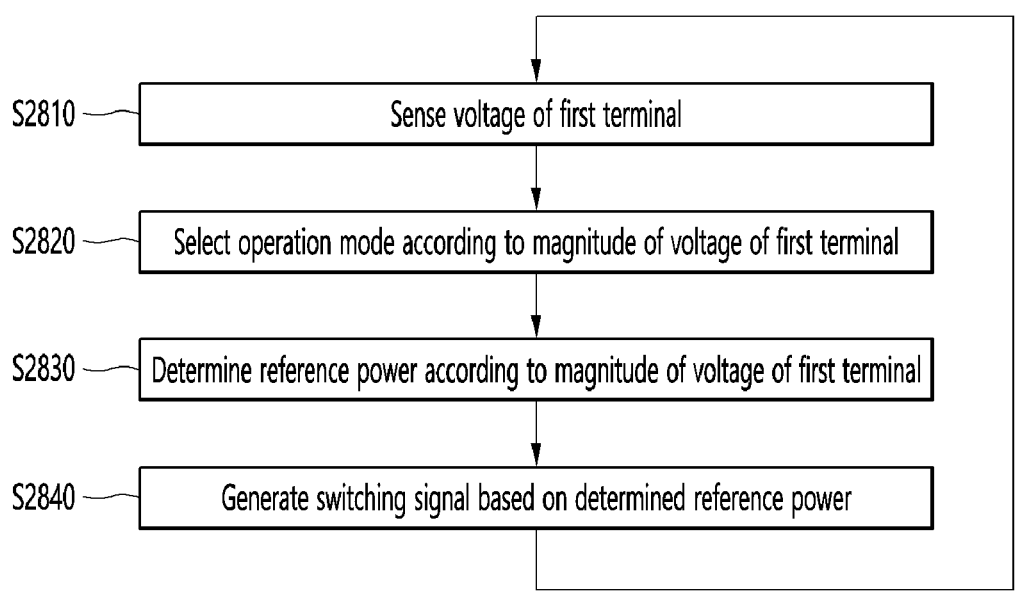
FIG. 28 is a view for describing a power conversion method of the energy storage system of FIG. 23.

FIG. 28 is a view for describing a power conversion method of the energy storage system of FIG. 23. Referring to FIG. 28, the power conversion method of the energy storage system may include sensing a voltage of a first terminal (S2810). The first terminal may refer to a node to which a DC/DC converter and a DC link capacitor are connected. A method of sensing the voltage of the first terminal may follow the description of FIG. 23.

The power conversion method of the energy storage system may include selecting an operation mode according to the magnitude of the voltage of the first terminal (S2820). The operation mode may be any one of a charging mode, a standby mode, and a discharging mode. A detailed description of S2820 follows FIG. 29.

The power conversion method of the energy storage system may include determining a reference power according to the magnitude of the voltage of the first terminal (S2830). A method of determining the reference power according to the magnitude of the voltage of the first terminal may follow the description of FIGS. 23 to 27 and the description of FIG. 30.

The power conversion method of the energy storage system may include generating a switching signal based on the determined reference power (S2840). The switching signal may control a switching operation of the bridge circuit unit operating in the charging mode or the discharging mode. A method of generating the switching signal based on the determined reference power may follow the description of FIGS. 23 to 27.

Figure 29:
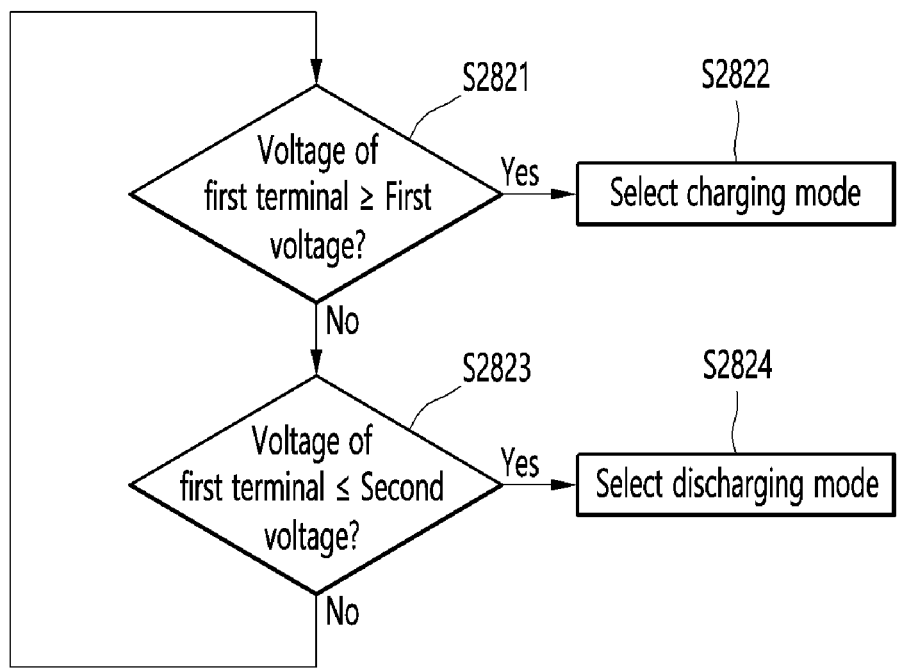
FIG. 29 is a view for describing a method of selecting an operation mode of FIG. 28.

FIG. 29 is a view for describing a method of selecting the operation mode of FIG. 28. Referring to FIG. 29, the method of selecting the operation mode may include determining whether a voltage of the first terminal is greater than or equal to a first voltage (S2821). When the voltage of the first terminal is greater than or equal to the first voltage (Yes in S2821), it is possible to include selecting the charging mode (S2822).

The method of selecting the operation mode may include determining whether the voltage of the first terminal is less than or equal to a second voltage (S2823) when the voltage of the first terminal is not greater than or equal to the first voltage (No in S2821). When a voltage of a second terminal is not greater than the second voltage (No in S2823), it is possible to include selecting the discharging mode (S2824).

In addition, when the voltage of the second terminal is not less than or equal to the second voltage, it is possible return to the step S2821.

Figure 30:
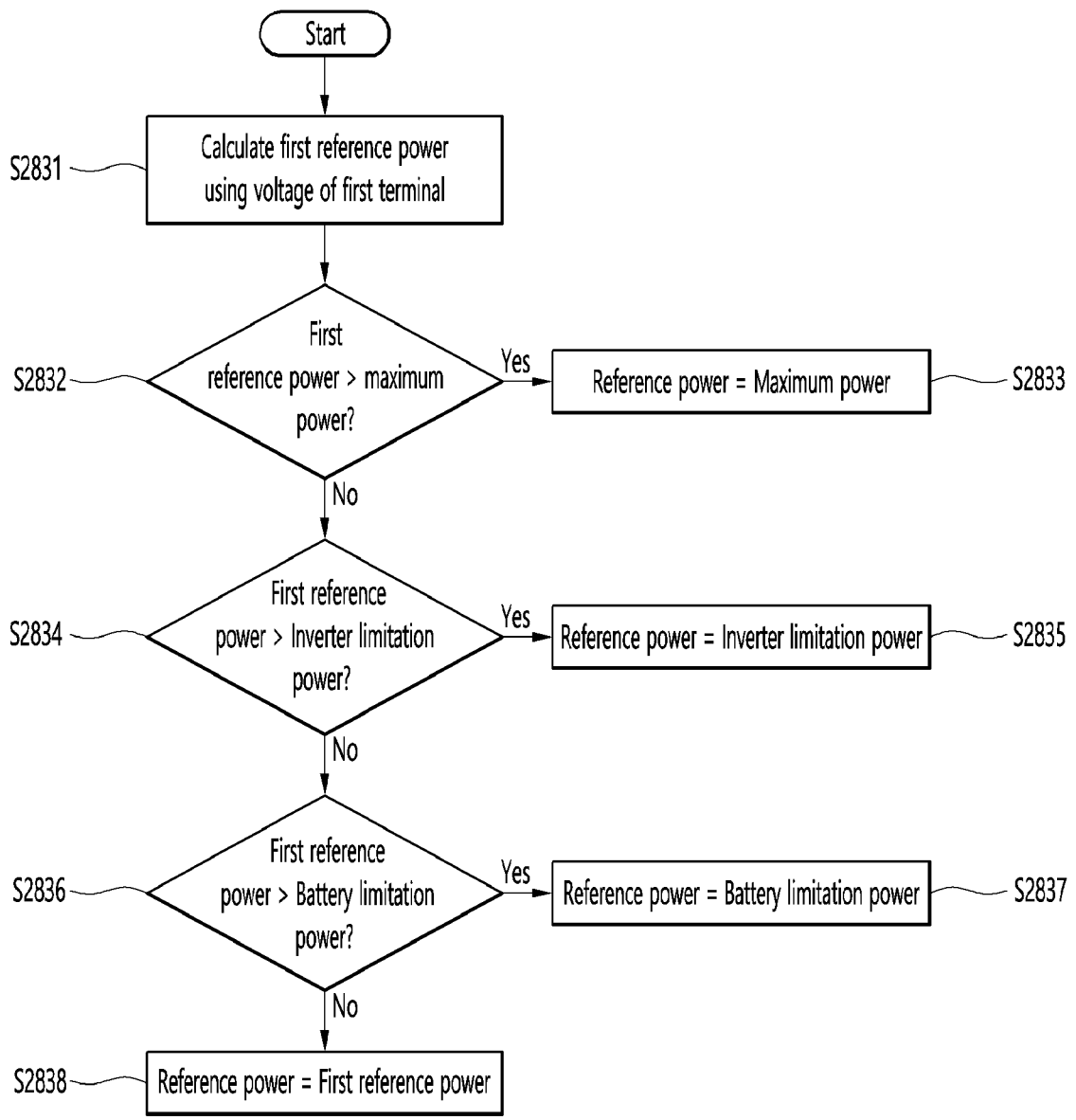
FIG. 30 is a view for describing a method of determining a reference power in FIG. 28.

FIG. 30 is a view for describing a method of determining the reference power in FIG. 28. Referring to FIG. 30, the method of determining the reference power may include calculating a first reference power using a voltage of a first terminal (S2831). A method of calculating the first reference power using the voltage of the first terminal may follow the description of FIGS. 23 to 25.

The method of determining the reference power may include determining whether the first reference power exceeds a maximum power (S2832). When the first reference power exceeds the maximum power (Yes in S2832), the reference power may be determined as the maximum power (S2833).

The method of determining the reference power may include determining whether the first reference power exceeds an inverter limitation power (S2834) when the first reference power does not exceed the maximum power (No in S2832). When the first reference power exceeds the inverter limitation power (Yes in S2834), the reference power may be determined as the inverter limitation power (S2835).

The method of determining the reference power may include determining whether the first reference power exceeds a battery limitation power (S2836) when the first reference power does not exceed the inverter limitation power (No in S2834). When the first reference power exceeds the battery limitation power (Yes in S2836), the reference power may be determined as the battery limitation power (S2837).

The method of determining the reference power may include determining the reference power as the first reference power (S2838) when the first reference power does not exceed the battery limitation power (No in S2838).

Therefore, the embodiment may quickly determine the operation mode of the charging or discharging of the battery. In addition, in the embodiment, a separate communication line and a communication unit are not required for droop control when charging or discharging the battery. According to one embodiment of the present invention, the above-described method may be implemented as a code that may be read by a processor on a medium on which a program is recorded. Examples of the processor readable medium include a ROM, a RAM, a CD-ROM, a magnetic tape, a floppy disk, an optical data storage system, and the like, and include implementation in the form of a carrier wave (for example, transmission via the Internet).

The embodiments described above are not applicable so that the configurations and methods described are limited, and the embodiments may be configured by selectively combining all or a part of the embodiments so that various modifications may be made.

In addition, embodiments of the present invention are shown and described, but the present invention is not limited to the above-described specific embodiments. It is needless to say that various modifications may be made by a person having an ordinary skill in the art to which the present invention pertains without departing from the gist of the present invention claimed in the claims, and such modifications should not be individually understood from the technological scope and perspective of the present invention.

The invention claimed is:

1. A DC-DC converter comprising:
a bridge circuit electrically connected to a DC link capacitor;
an inductor and a capacitor electrically connected to the bridge circuit, wherein the inductor is connected to a first end of a battery, and the capacitor is connected to the first end and a second end of the battery;
a sensor configured to sense a voltage between the bridge circuit and the DC link capacitor; and
a controller configured to control switching operations of the bridge circuit so that a first power output by the DC-DC converter and supplied to the first end of the battery has a droop curve-shaped power value according to the sensed voltage, and
when the sensed voltage is greater than or equal to a first voltage, the first power corresponds to a product of a preset charging slope constant and a first delta voltage that is a difference between the sensed voltage and the first voltage.

2. The DC-DC converter of claim 1, wherein when the sensed voltage is less than or equal to a second voltage, the controller is further configured to control the switching operations of the bridge circuit so that a second power is discharged from the battery, and
wherein the second voltage is lower than the first voltage.

3. The DC-DC converter of claim 2, wherein the second power corresponds to a product of a preset discharging slop constant and a second delta voltage that is a difference between the sensed voltage and the second voltage.

4. The DC-DC converter of claim 2, wherein the controller is further configured to control the switching operations of the bridge circuit so that power supplied to the first end of the battery is zero when the sensed voltage is between the first voltage and the second voltage.

5. The DC-DC converter of claim 1, wherein the bridge circuit includes a first full bridge circuit including first, second, third and fourth switching elements, and includes a second full bridge circuit including fifth, sixth, seventh and eighth switching elements,
wherein the DC-DC converter further includes a transformer including a first coil connected to the first full bridge circuit and a second coil connected to the second full bridge circuit,
wherein the first full bridge circuit includes a first leg and a second leg between first and second nodes,
wherein the first leg includes the first switching element connected between the first node and a third node and the second switching element connected between the third node and the second node, and the second leg includes the third switching element connected between the first node and a fourth node and the fourth switching element connected between the fourth node and the second node,
wherein the battery and the capacitor are connected between fifth and sixth nodes, the inductor is connected between the fifth node and a seventh node, and the second coil is connected between tenth and ninth nodes,
wherein the second full bridge circuit includes a third leg and a fourth leg between the seventh node and an eighth node, and
wherein the third leg includes the fifth switching element connected between the seventh node and the ninth node, and the sixth switching element connected between the ninth node and the eighth node, and the fourth leg includes the seventh switching element connected between the seventh node and the tenth node, and the eighth switching element connected between the tenth node and the eighth node.

6. The DC-DC converter of claim 5, wherein the controller is further configured to control the switching operations of the bridge circuit by turning on the seventh switching element and the sixth switching element and turning off the fifth switching element and the eighth switching element of the second full bridge circuit, and by turning on the first switching element and the fourth switching element and turning off the second switching element and the third switching element of the first full bridge circuit.

7. The DC-DC converter of claim 5, wherein the controller is further configured to control the switching operations of the bridge circuit by turning on the fifth switching element and the eighth switching element and turning off the sixth switching element and the seventh switching element of the second full bridge circuit, and by turning on the third switching element and the second switching element and turning off the first switching element and the fourth switching element of the first full bridge circuit.

8. A DC-DC converter comprising:
a first bridge circuit;
a second bridge circuit;
a transformer connected between the first bridge circuit and the second bridge circuit;
an LC circuit connected to the second bridge circuit, wherein the LC circuit is connected to a battery;
a sensor configured to sense a voltage of a first end of the first bridge circuit; and
a controller configured to:
control switching operations of the second bridge circuit so that a charging power corresponding to a first power supplied to the battery has a droop curve-shaped power value according to the sensed voltage, and
when the sensed voltage is greater than or equal to a first voltage, the first power corresponds to a product of a preset charging slope constant and a first delta voltage that is a difference between the sensed voltage and the first voltage.

9. The DC-DC converter of claim 8, wherein when the sensed voltage is less than or equal to a second voltage, the controller is further configured to control the switching operations of the second bridge circuit so that a second power is discharged from the battery, and
wherein the second voltage is lower than the first voltage.

10. The DC-DC converter of claim 8, wherein the second power corresponds to a product of a preset discharging slope constant and a second delta voltage that is a difference between the sensed voltage and the second voltage.

11. The DC-DC converter of claim 9, wherein controller is further configured to control the switching operations of the second bridge circuit so that a power supplied to the first end of the battery is zero when the sensed voltage is a voltage between the first voltage and the second voltage.

12. A method of controlling a DC-DC converter for a charging/discharging of a battery, the DC-DC converter including a DC link capacitor and a bridge circuit disposed between the DC link capacitor and the battery, the method comprising sensing, via a sensor of the DC-DC converter, a voltage between the DC link capacitor and the bridge circuit;
controlling, via a controller of the DC-DC converter, switching operations of the bridge circuit so that a power corresponding to a first power is supplied to the battery and the battery is charged with the first power when the sensed voltage is greater than or equal to a first voltage; and
discharging the battery with a second power when the sensed voltage is less than or equal to a second voltage,
wherein the first power corresponds to a product of a preset charging slope constant and a first delta voltage that is a difference between the sensed voltage and the first voltage, and
wherein the second power corresponds to a product of a preset discharging slope constant and a second delta voltage that is a difference between the sensed voltage and the second voltage.

13. The method of claim 12, further comprising:
stopping the charging or discharging of the battery when the sensed voltage is between the first voltage and the second voltage.

* * * * *